(12) United States Patent
Lum et al.

(10) Patent No.: US 8,051,140 B2
(45) Date of Patent: *Nov. 1, 2011

(54) METHODS AND SYSTEMS FOR IMAGING DEVICE CONTROL

(75) Inventors: Joey P. Lum, Irvine, CA (US); Uoc H. Nguyen, Long Beach, CA (US); Boguslaw Ludwik Plewnia, Mission Viejo, CA (US); Lena Sojian, Fountain Valley, CA (US); Mark Liu Stevens, Laguna Hills, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 739 days.

This patent is subject to a terminal disclaimer.

(21) Appl. No.: 11/256,479

(22) Filed: Oct. 21, 2005

(65) Prior Publication Data

US 2006/0077414 A1 Apr. 13, 2006

Related U.S. Application Data

(63) Continuation-in-part of application No. 10/962,248, filed on Oct. 8, 2004, and a continuation-in-part of application No. 10/961,793, filed on Oct. 8, 2004, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004, now Pat. No. 7,969,596.

(60) Provisional application No. 60/704,066, filed on Jul. 28, 2005.

(51) Int. Cl.
*G06F 15/16* (2006.01)

(52) U.S. Cl. .................................................... 709/217
(58) Field of Classification Search .......... 709/201–204, 709/216–218
See application file for complete search history.

(56) References Cited

U.S. PATENT DOCUMENTS

| 5,085,587 A | 2/1992 | DesForges et al. |
| 5,228,100 A | 7/1993 | Takeda et al. |
| 5,323,393 A | 6/1994 | Barrett et al. |
| 5,365,494 A | 11/1994 | Lynch |
| 5,410,646 A | 4/1995 | Tondeviod et al. |
| 5,504,589 A | 4/1996 | Montague et al. |
| 5,513,112 A | 4/1996 | Herring et al. |
| 5,659,845 A | 8/1997 | Krist et al. |
| 5,671,412 A | 9/1997 | Christiano |
| 5,699,493 A | 12/1997 | Davidson et al. |
| 5,699,494 A | 12/1997 | Colbert et al. |
| 5,717,439 A | 2/1998 | Levine et al. |

(Continued)

FOREIGN PATENT DOCUMENTS

EP 1160657 12/2001

(Continued)

OTHER PUBLICATIONS

U.S. Appl. No. 10/961,911—Office Action dated Apr. 16, 2008.

(Continued)

*Primary Examiner* — Joon H Hwang
*Assistant Examiner* — Thomas Lee, IV
(74) *Attorney, Agent, or Firm* — Krieger Intellectual Property, Inc.; Scott C. Krieger

(57) ABSTRACT

Embodiments of the present invention comprise systems, methods and devices for exposing imaging device functions to an application.

16 Claims, 28 Drawing Sheets

U.S. PATENT DOCUMENTS

| | | | |
|---|---|---|---|
| 5,726,883 A | 3/1998 | Levine et al. | |
| 5,727,082 A | 3/1998 | Sugishima | |
| 5,727,135 A | 3/1998 | Webb et al. | |
| 5,745,883 A | 4/1998 | Krist et al. | |
| 5,760,775 A | 6/1998 | Sklut et al. | |
| 5,774,678 A | 6/1998 | Motoyama | |
| 5,791,790 A | 8/1998 | Bender et al. | |
| 5,796,934 A | 8/1998 | Bhanot et al. | |
| 5,799,206 A | 8/1998 | Kitagawa et al. | |
| 5,799,289 A | 8/1998 | Fukushima et al. | |
| 5,812,818 A | 9/1998 | Adler et al. | |
| 5,832,264 A | 11/1998 | Hart et al. | |
| 5,877,776 A | 3/1999 | Beaman et al. | |
| 5,944,824 A | 8/1999 | He | |
| 5,956,487 A | 9/1999 | Venkatraman et al. | |
| 5,956,698 A | 9/1999 | Lacheze et al. | |
| 5,968,127 A | 10/1999 | Kawabe et al. | |
| 5,993,088 A | 11/1999 | Nogay et al. | |
| 5,995,553 A | 11/1999 | Crandall et al. | |
| 5,999,708 A | 12/1999 | Kajita | |
| 6,042,384 A | 3/2000 | Loiacono | |
| 6,044,382 A | 3/2000 | Martino | |
| 6,069,706 A | 5/2000 | Kajita | |
| 6,075,860 A | 6/2000 | Ketcham | |
| 6,115,132 A | 9/2000 | Nakatsuma et al. | |
| 6,118,546 A | 9/2000 | Sanchez | |
| 6,128,731 A | 10/2000 | Zarrin et al. | |
| 6,141,662 A | 10/2000 | Jeyachandran | |
| 6,148,346 A | 11/2000 | Hanson | |
| 6,161,139 A | 12/2000 | Win et al. | |
| 6,178,308 B1 | 1/2001 | Bobrow et al. | |
| 6,199,080 B1 | 3/2001 | Nielsen | |
| 6,213,652 B1 | 4/2001 | Suzuki et al. | |
| 6,216,113 B1 | 4/2001 | Aikens et al. | |
| 6,233,409 B1 | 5/2001 | Haines et al. | |
| 6,240,456 B1 | 5/2001 | Teng et al. | |
| 6,246,487 B1 | 6/2001 | Kobayashi | |
| 6,292,267 B1 | 9/2001 | Mori et al. | |
| 6,301,016 B1 | 10/2001 | Matsueda et al. | |
| 6,307,640 B1 | 10/2001 | Motegi | |
| 6,311,040 B1 | 10/2001 | Kucinski et al. | |
| 6,353,878 B1 | 3/2002 | Dunham | |
| 6,369,905 B1 | 4/2002 | Mitsuhashi et al. | |
| 6,426,798 B1 | 7/2002 | Yeung | |
| 6,433,883 B1 | 8/2002 | Kajita | |
| 6,438,589 B1 * | 8/2002 | Iwata | 709/218 |
| 6,476,926 B1 | 11/2002 | Yano et al. | |
| 6,490,601 B1 | 12/2002 | Markus et al. | |
| 6,510,466 B1 | 1/2003 | Cox et al. | |
| 6,516,157 B1 | 2/2003 | Maruta et al. | |
| 6,526,258 B2 | 2/2003 | Bejar et al. | |
| 6,567,179 B1 | 5/2003 | Sato et al. | |
| 6,590,673 B2 | 7/2003 | Kadowaki | |
| 6,592,275 B2 | 7/2003 | Aihara et al. | |
| 6,597,469 B1 | 7/2003 | Kuroyanagi | |
| 6,604,157 B1 | 8/2003 | Brusky et al. | |
| 6,621,422 B2 | 9/2003 | Rubenstein | |
| 6,636,929 B1 | 10/2003 | Frantz et al. | |
| 6,643,650 B1 | 11/2003 | Slaughter et al. | |
| 6,652,169 B2 | 11/2003 | Parry | |
| 6,685,637 B1 | 2/2004 | Rom | |
| 6,707,466 B1 | 3/2004 | Van Sickle et al. | |
| 6,721,286 B1 | 4/2004 | Williams et al. | |
| 6,735,773 B1 | 5/2004 | Trinh et al. | |
| 6,749,434 B2 | 6/2004 | Stuppy | |
| 6,772,945 B2 | 8/2004 | Mahoney et al. | |
| 6,775,729 B1 | 8/2004 | Matsuo et al. | |
| 6,826,727 B1 | 11/2004 | Mohr et al. | |
| 6,836,623 B2 | 12/2004 | Imai | |
| 6,836,845 B1 | 12/2004 | Lennie et al. | |
| 6,850,252 B1 | 2/2005 | Hoffberg | |
| 6,862,110 B2 | 3/2005 | Harrington | |
| 6,873,429 B2 | 3/2005 | Matsuura | |
| 6,874,010 B1 | 3/2005 | Sargent | |
| 6,904,412 B1 | 6/2005 | Broadbent et al. | |
| 6,915,525 B2 | 7/2005 | Ozawa | |
| 6,934,706 B1 | 8/2005 | Mancuso et al. | |
| 6,934,740 B1 | 8/2005 | Lawande et al. | |
| 6,940,532 B1 | 9/2005 | Fukui et al. | |
| 6,948,175 B1 | 9/2005 | Fong et al. | |
| 6,951,303 B2 | 10/2005 | Peterson et al. | |
| 6,975,820 B2 | 12/2005 | Wong | |
| 6,999,987 B1 | 2/2006 | Billingsley et al. | |
| 7,013,289 B2 | 3/2006 | Horn et al. | |
| 7,019,753 B2 | 3/2006 | Rappaport et al. | |
| 7,079,143 B2 | 7/2006 | Gilbert | |
| 7,095,513 B2 | 8/2006 | Stringham | |
| 7,107,615 B2 | 9/2006 | Cossel et al. | |
| 7,124,097 B2 | 10/2006 | Claremont et al. | |
| 7,126,717 B2 | 10/2006 | Jeyachandran | |
| 7,127,700 B2 | 10/2006 | Large | |
| 7,136,909 B2 | 11/2006 | Balasuriya | |
| 7,136,941 B2 | 11/2006 | Nguyen et al. | |
| 7,143,364 B1 | 11/2006 | Tam | |
| 7,145,673 B1 | 12/2006 | Lin | |
| 7,149,697 B2 | 12/2006 | Zerza et al. | |
| 7,162,103 B2 | 1/2007 | Meunier et al. | |
| 7,170,618 B2 | 1/2007 | Fujitani et al. | |
| 7,174,056 B2 | 2/2007 | Silverbrook et al. | |
| 7,177,814 B2 | 2/2007 | Gong et al. | |
| 7,181,017 B1 | 2/2007 | Nagel et al. | |
| 7,181,442 B2 | 2/2007 | Yeh et al. | |
| 7,185,078 B2 | 2/2007 | Pleyer et al. | |
| 7,188,125 B1 | 3/2007 | Karr | |
| 7,188,181 B1 | 3/2007 | Squier et al. | |
| 7,191,391 B2 | 3/2007 | Takashima | |
| 7,197,615 B2 | 3/2007 | Arakawa et al. | |
| 7,203,699 B2 | 4/2007 | Bellamy | |
| 7,212,301 B2 | 5/2007 | Treibach-Heck et al. | |
| 7,216,347 B1 | 5/2007 | Harrison et al. | |
| 7,233,929 B1 | 6/2007 | Lingle et al. | |
| 7,239,409 B2 | 7/2007 | Parry | |
| RE39,808 E | 9/2007 | Motegi | |
| 7,272,269 B2 | 9/2007 | Tojo et al. | |
| 7,275,044 B2 | 9/2007 | Chauvin et al. | |
| 7,284,061 B2 | 10/2007 | Matsubayashi et al. | |
| 7,293,034 B2 | 11/2007 | Paya et al. | |
| 7,296,221 B1 | 11/2007 | Treibach-Heck et al. | |
| 7,301,658 B2 | 11/2007 | Henry | |
| 7,305,616 B1 | 12/2007 | Nelson et al. | |
| 7,321,440 B2 | 1/2008 | Kimura | |
| 7,325,196 B1 | 1/2008 | Covington et al. | |
| 7,327,478 B2 | 2/2008 | Matsuda | |
| 7,328,245 B1 | 2/2008 | Hull et al. | |
| 7,343,551 B1 | 3/2008 | Bourdev | |
| 7,349,949 B1 | 3/2008 | Connor et al. | |
| 7,363,586 B1 | 4/2008 | Briggs et al. | |
| 7,404,204 B2 | 7/2008 | Davenport et al. | |
| 7,406,660 B1 | 7/2008 | Sikchi et al. | |
| 7,444,519 B2 | 10/2008 | Laferriere et al. | |
| 7,451,392 B1 | 11/2008 | Chalecki et al. | |
| 7,454,623 B2 | 11/2008 | Hardt | |
| 7,467,211 B1 | 12/2008 | Herman et al. | |
| 7,496,837 B1 | 2/2009 | Larcheveque et al. | |
| 7,500,178 B1 | 3/2009 | O'Donnell | |
| 7,508,535 B2 | 3/2009 | Hart et al. | |
| 7,509,649 B2 | 3/2009 | Shenfield | |
| 7,545,528 B2 | 6/2009 | Takabayashi et al. | |
| 7,548,334 B2 | 6/2009 | Lo et al. | |
| 7,552,265 B2 | 6/2009 | Newman et al. | |
| 7,565,554 B2 | 7/2009 | Joosten et al. | |
| 7,567,360 B2 | 7/2009 | Takahashi et al. | |
| 7,573,593 B2 | 8/2009 | Hart et al. | |
| 7,729,363 B2 | 6/2010 | Shenfield et al. | |
| 2001/0021945 A1 | 9/2001 | Matsuura | |
| 2001/0027527 A1 | 10/2001 | Khidekel et al. | |
| 2001/0028808 A1 | 10/2001 | Nomura et al. | |
| 2001/0038462 A1 | 11/2001 | Teeuwen et al. | |
| 2001/0039614 A1 | 11/2001 | Hellberg et al. | |
| 2001/0044787 A1 | 11/2001 | Shwartz et al. | |
| 2002/0016921 A1 | 2/2002 | Olsen et al. | |
| 2002/0029256 A1 | 3/2002 | Zintel et al. | |
| 2002/0032745 A1 | 3/2002 | Honda | |
| 2002/0049786 A1 | 4/2002 | Bibliowicz et al. | |
| 2002/0052916 A1 | 5/2002 | Kloba et al. | |
| 2002/0055984 A1 | 5/2002 | Chang et al. | |
| 2002/0059265 A1 | 5/2002 | Valorose, III | |

| | | |
|---|---|---|
| 2002/0073148 A1 | 6/2002 | Haines et al. |
| 2002/0080381 A1 | 6/2002 | Haines |
| 2002/0089691 A1 | 7/2002 | Fertlitsch et al. |
| 2002/0093676 A1 | 7/2002 | Parry |
| 2002/0098027 A1 | 7/2002 | Koike et al. |
| 2002/1009979 | 7/2002 | Chou |
| 2002/0103827 A1 | 8/2002 | Sesek |
| 2002/0105664 A1 | 8/2002 | Inoue et al. |
| 2002/0107939 A1 | 8/2002 | Ford et al. |
| 2002/0109718 A1 | 8/2002 | Mansour et al. |
| 2002/0112037 A1 | 8/2002 | Koss |
| 2002/0120792 A1 | 8/2002 | Blair |
| 2002/0138279 A1 | 9/2002 | Al-Kazily et al. |
| 2002/0138476 A1 | 9/2002 | Suwa et al. |
| 2002/0138666 A1 | 9/2002 | Fujisawa |
| 2002/0145627 A1 | 10/2002 | Whitmarsh |
| 2002/0147858 A1 | 10/2002 | Motoyama et al. |
| 2002/0152183 A1 | 10/2002 | Soares et al. |
| 2002/0152235 A1 | 10/2002 | Motoyama et al. |
| 2002/0152302 A1 | 10/2002 | Motoyama et al. |
| 2002/0156846 A1 | 10/2002 | Rawat et al. |
| 2002/0171857 A1 | 11/2002 | Hisatomi |
| 2002/0194350 A1 | 12/2002 | Lu et al. |
| 2003/0002074 A1 | 1/2003 | Miyano |
| 2003/0007170 A1 | 1/2003 | Kajita et al. |
| 2003/0011633 A1 * | 1/2003 | Conley et al. .................. 345/762 |
| 2003/0011640 A1 | 1/2003 | Green |
| 2003/0014515 A1 | 1/2003 | Motoyama et al. |
| 2003/0014529 A1 | 1/2003 | Simpson et al. |
| 2003/0033369 A1 | 2/2003 | Bernhard |
| 2003/0035133 A1 | 2/2003 | Berkema et al. |
| 2003/0038965 A1 | 2/2003 | Simpson et al. |
| 2003/0043205 A1 | 3/2003 | Hill |
| 2003/0043396 A1 | 3/2003 | Klosterman et al. |
| 2003/0048470 A1 | 3/2003 | Garcia |
| 2003/0048473 A1 | 3/2003 | Rosen |
| 2003/0049037 A1 | 3/2003 | Sadowara et al. |
| 2003/0053123 A1 | 3/2003 | Wu et al. |
| 2003/0063313 A1 | 4/2003 | Ito |
| 2003/0065766 A1 | 4/2003 | Parry |
| 2003/0065791 A1 | 4/2003 | Garg et al. |
| 2003/0074312 A1 | 4/2003 | White |
| 2003/0081240 A1 | 5/2003 | Soto et al. |
| 2003/0084114 A1 | 5/2003 | Simpson et al. |
| 2003/0084302 A1 | 5/2003 | de Jong et al. |
| 2003/0088642 A1 | 5/2003 | Price et al. |
| 2003/0123112 A1 | 7/2003 | Kajita et al. |
| 2003/0142351 A1 | 7/2003 | Sakura |
| 2003/0164987 A1 | 9/2003 | Enomoto et al. |
| 2003/0182632 A1 | 9/2003 | Murdock et al. |
| 2003/0184552 A1 | 10/2003 | Chadha |
| 2003/0184590 A1 | 10/2003 | Will |
| 2003/0184782 A1 | 10/2003 | Perkins |
| 2003/0187922 A1 | 10/2003 | Ohara et al. |
| 2003/0188193 A1 | 10/2003 | Venkaramappa |
| 2003/0197883 A1 | 10/2003 | Lay et al. |
| 2003/0225796 A1 | 12/2003 | Matsubara |
| 2003/0225829 A1 | 12/2003 | Pena et al. |
| 2003/0225894 A1 | 12/2003 | Ito |
| 2003/0231196 A1 | 12/2003 | Keohane et al. |
| 2004/0003341 A1 | 1/2004 | alSafadi et al. |
| 2004/0008363 A1 | 1/2004 | Suzuki et al. |
| 2004/0012628 A1 | 1/2004 | Kropf et al. |
| 2004/0012644 A1 | 1/2004 | Allen et al. |
| 2004/0030693 A1 | 2/2004 | Toda |
| 2004/0034786 A1 | 2/2004 | Okamoto et al. |
| 2004/0039990 A1 | 2/2004 | Bakar et al. |
| 2004/0044779 A1 | 3/2004 | Lambert |
| 2004/0054573 A1 | 3/2004 | Shah et al. |
| 2004/0061729 A1 | 4/2004 | Green |
| 2004/0064759 A1 | 4/2004 | McGuire et al. |
| 2004/0068693 A1 | 4/2004 | Rawat et al. |
| 2004/0070606 A1 | 4/2004 | Yang et al. |
| 2004/0080511 A1 | 4/2004 | Gilbert |
| 2004/0080771 A1 | 4/2004 | Mihira et al. |
| 2004/0080778 A1 | 4/2004 | Ito et al. |
| 2004/0093515 A1 | 5/2004 | Reeves, Jr. |
| 2004/0098165 A1 | 5/2004 | Butikofer |
| 2004/0098316 A1 | 5/2004 | Philippe et al. |
| 2004/0098595 A1 | 5/2004 | Apperle et al. |
| 2004/0105104 A1 | 6/2004 | Ishikawa et al. |
| 2004/0105122 A1 | 6/2004 | Schaeffer |
| 2004/0109028 A1 | 6/2004 | Stern et al. |
| 2004/0111670 A1 | 6/2004 | Sasakuma et al. |
| 2004/0113941 A1 | 6/2004 | Sliwa et al. |
| 2004/0117358 A1 | 6/2004 | von Kaenel et al. |
| 2004/0117784 A1 | 6/2004 | Endoh |
| 2004/0125403 A1 | 7/2004 | Furst et al. |
| 2004/0128349 A1 | 7/2004 | Maruyama |
| 2004/0130744 A1 | 7/2004 | Wu et al. |
| 2004/0130749 A1 | 7/2004 | Aoki |
| 2004/0133525 A1 | 7/2004 | Singh et al. |
| 2004/0150663 A1 | 8/2004 | Kim |
| 2004/0158471 A1 | 8/2004 | Davis et al. |
| 2004/0161257 A1 | 8/2004 | Ishihara |
| 2004/0162076 A1 | 8/2004 | Chowdry et al. |
| 2004/0165209 A1 | 8/2004 | Aoki et al. |
| 2004/0169881 A1 | 9/2004 | Sato |
| 2004/0179229 A1 | 9/2004 | Laughlin |
| 2004/0187018 A1 | 9/2004 | Owen et al. |
| 2004/0199538 A1 | 10/2004 | Matsuda et al. |
| 2004/0203358 A1 | 10/2004 | Anderson |
| 2004/0205118 A1 | 10/2004 | Yu |
| 2004/0205533 A1 | 10/2004 | Lopata et al. |
| 2004/0205620 A1 | 10/2004 | Nishikiori et al. |
| 2004/0212823 A1 | 10/2004 | Chavers et al. |
| 2004/0215671 A1 | 10/2004 | Hyakutake et al. |
| 2004/0221231 A1 | 11/2004 | Madril et al. |
| 2004/0223778 A1 | 11/2004 | Zwiefelhofer |
| 2004/0226993 A1 | 11/2004 | Fulcher et al. |
| 2004/0227968 A1 * | 11/2004 | Nakamura et al. ........... 358/1.13 |
| 2004/0230500 A1 | 11/2004 | Imago |
| 2004/0236862 A1 | 11/2004 | Ito |
| 2004/0254955 A1 | 12/2004 | Reese et al. |
| 2004/0255263 A1 | 12/2004 | Ando |
| 2004/0268229 A1 | 12/2004 | Paoli et al. |
| 2004/0268306 A1 | 12/2004 | Cheng et al. |
| 2005/0005094 A1 | 1/2005 | Jamieson et al. |
| 2005/0015472 A1 | 1/2005 | Catania et al. |
| 2005/0015585 A1 | 1/2005 | Kurose |
| 2005/0026593 A1 | 2/2005 | Anderson et al. |
| 2005/0028086 A1 | 2/2005 | Itavaara et al. |
| 2005/0044248 A1 | 2/2005 | Mihira et al. |
| 2005/0055475 A1 | 3/2005 | MacKay et al. |
| 2005/0057560 A1 | 3/2005 | Bibr et al. |
| 2005/0060046 A1 | 3/2005 | Ito et al. |
| 2005/0060564 A1 * | 3/2005 | Murakami et al. ............ 713/200 |
| 2005/0063010 A1 | 3/2005 | Giannetti |
| 2005/0068581 A1 | 3/2005 | Hull et al. |
| 2005/0071507 A1 | 3/2005 | Ferlitsch |
| 2005/0071746 A1 | 3/2005 | Hart et al. |
| 2005/0080645 A1 | 4/2005 | Alvarez et al. |
| 2005/0091087 A1 * | 4/2005 | Smith et al. ....................... 705/5 |
| 2005/0091490 A1 | 4/2005 | Ogura |
| 2005/0097458 A1 | 5/2005 | Wilson |
| 2005/0108353 A1 | 5/2005 | Yamamoto |
| 2005/0114267 A1 | 5/2005 | Miwa et al. |
| 2005/0114658 A1 * | 5/2005 | Dye et al. ....................... 713/165 |
| 2005/0114766 A1 | 5/2005 | Yamamoto |
| 2005/0129423 A1 | 6/2005 | Lester et al. |
| 2005/0149576 A1 | 7/2005 | Marmaros et al. |
| 2005/0152334 A1 | 7/2005 | Okamoto et al. |
| 2005/0185217 A1 | 8/2005 | Nishizawa et al. |
| 2005/0195221 A1 | 9/2005 | Berger et al. |
| 2005/0223413 A1 | 10/2005 | Duggan et al. |
| 2005/0231755 A1 * | 10/2005 | Araumi et al. ............... 358/1.15 |
| 2005/0246428 A1 * | 11/2005 | Araumi ......................... 709/217 |
| 2005/0257134 A1 | 11/2005 | Goodman et al. |
| 2005/0257148 A1 | 11/2005 | Goodman et al. |
| 2005/0265744 A1 | 12/2005 | Uruta |
| 2006/0007480 A1 | 1/2006 | Yokokura |
| 2006/0010180 A1 | 1/2006 | Kawamura et al. |
| 2006/0015734 A1 | 1/2006 | Atobe |
| 2006/0028397 A1 | 2/2006 | O'Rourke |
| 2006/0031411 A1 | 2/2006 | Gimson et al. |
| 2006/0038004 A1 | 2/2006 | Rielly et al. |
| 2006/0056873 A1 | 3/2006 | Kimura |
| 2006/0059434 A1 | 3/2006 | Boss et al. |

| | | | | | | |
|---|---|---|---|---|---|---|
| 2006/0064647 | A1 | 3/2006 | Tapuska et al. | JP | 2005059496 | 3/2005 |
| 2006/0077423 | A1 | 4/2006 | Mathieson et al. | JP | 2005078278 | 3/2005 |
| 2006/0077432 | A1 | 4/2006 | Lovat et al. | JP | 2005084891 | 3/2005 |
| 2006/0077439 | A1 | 4/2006 | Yamamura et al. | JP | 2005115543 | 4/2005 |
| 2006/0077444 | A1 | 4/2006 | Lum et al. | JP | 2005004243 | 6/2005 |
| 2006/0085835 | A1 | 4/2006 | Istvan et al. | JP | 2005209059 | 8/2005 |
| 2006/0112123 | A1 | 5/2006 | Clark et al. | JP | 2005219440 A | 8/2005 |
| 2006/0154227 | A1 | 7/2006 | Rossi et al. | JP | 2005235034 A | 9/2005 |
| 2006/0162076 | A1 | 7/2006 | Bartlett et al. | JP | 2005269250 | 9/2005 |
| 2006/0198653 | A1 | 9/2006 | Plewnia et al. | JP | 2006053905 | 2/2006 |
| 2006/0224405 | A1 | 10/2006 | White et al. | JP | 2006140898 | 6/2006 |
| 2006/0279475 | A1 | 12/2006 | Lum et al. | WO | WO0118754 A1 | 3/2001 |
| 2007/0022180 | A1 | 1/2007 | Cocotis et al. | WO | WO01/33381 | 5/2001 |
| 2007/0041035 | A1 | 2/2007 | Sembower et al. | WO | WO0198864 | 12/2001 |
| 2007/0094103 | A1 | 4/2007 | Hyakutake et al. | | | |
| 2007/0173266 | A1 | 7/2007 | Barnes, Jr. | | | |
| 2007/0174894 | A1 | 7/2007 | Matsunaga | | | |
| 2007/0186150 | A1 | 8/2007 | Rao et al. | | | |
| 2008/0072162 | A1 | 3/2008 | Dauerer et al. | | | |

FOREIGN PATENT DOCUMENTS

| | | |
|---|---|---|
| JP | 09160441 | 12/1995 |
| JP | 08234945 | 9/1996 |
| JP | 09293036 | 11/1997 |
| JP | 09330190 | 12/1997 |
| JP | 10013695 | 1/1998 |
| JP | 10154190 A | 6/1998 |
| JP | 10240490 | 9/1998 |
| JP | 10269184 | 10/1998 |
| JP | 2000112691 | 4/2000 |
| JP | 2000174949 | 6/2000 |
| JP | 2000207108 | 7/2000 |
| JP | 2002259071 | 2/2001 |
| JP | 2001268296 | 9/2001 |
| JP | 200284383 | 3/2002 |
| JP | 2002140195 | 5/2002 |
| JP | 2002175195 | 6/2002 |
| JP | 2002221877 | 8/2002 |
| JP | 2002236830 | 8/2002 |
| JP | 2002298049 A | 10/2002 |
| JP | 2002312148 | 10/2002 |
| JP | 2002330253 | 11/2002 |
| JP | 2002351644 | 12/2002 |
| JP | 2003022258 | 1/2003 |
| JP | 2003050781 | 2/2003 |
| JP | 2003157155 A | 5/2003 |
| JP | 2003178023 | 6/2003 |
| JP | 2003196554 A | 7/2003 |
| JP | 2003198792 | 7/2003 |
| JP | 2003208484 | 7/2003 |
| JP | 2003209644 | 7/2003 |
| JP | 2003216368 | 7/2003 |
| JP | 2003216395 A | 7/2003 |
| JP | 2003223299 | 8/2003 |
| JP | 2003260853 | 9/2003 |
| JP | 2003281227 | 10/2003 |
| JP | 2003288179 | 10/2003 |
| JP | 2003308195 | 10/2003 |
| JP | 200430448 | 1/2004 |
| JP | 2004074530 | 3/2004 |
| JP | 2004088561 | 3/2004 |
| JP | 2004094313 | 3/2004 |
| JP | 2004128561 | 4/2004 |
| JP | 2004118549 | 5/2004 |
| JP | 2004164157 A | 6/2004 |
| JP | 2004185396 | 7/2004 |
| JP | 2004213356 | 7/2004 |
| JP | 2004215309 | 7/2004 |
| JP | 2004222247 | 8/2004 |
| JP | 2004228686 | 8/2004 |
| JP | 2004228687 | 8/2004 |
| JP | 2004240752 | 8/2004 |
| JP | 2004246771 | 9/2004 |
| JP | 2004310326 | 11/2004 |
| JP | 2004310516 | 11/2004 |
| JP | 2004276271 | 12/2004 |
| JP | 2004358800 | 12/2004 |
| JP | 2005014591 | 1/2005 |
| JP | 2005033460 | 2/2005 |

OTHER PUBLICATIONS

U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
Canon USA, Inc.; MEAP Multifunctional Embedded Application Platform; Aug. 2004; http://developersupport.canon.com/Web_MEAP_Presentation.pdf.
Canon USA, Inc.; MEAP: FAQ; accessed on Jul. 2004, pub. date unknown; http://developersupprt.canon.com/MEAP.htm.
Xerox, Inc.; Xerox FreeFlow digital workflow collection; 2003; http://www.xerox.com/downloads/usa/en/s/solutions_digital_workflow_whitepaper_sdk.pdf.
Ricoh Company, Ltd.; Ricoh's Medium-Term Management Plan; Mar. 19, 2002; http://www.ricoh.com/IR/data/pre/pdf/ir_pre2002.pdf.
Ricoh Company, Ltd.; White Paper: Embedded Software Architecture SDK; Jun. 25, 2003; http://www.ricoh-usa.com/products/concept/esa.asp?catname=ESA.
Hewlett-Packard Company; JetCAPS Scan2Folder; 2003; http://www.jetcaps.se/resources/datasheets/ds_scan2folder.pdf.
Hewlett-Packard Company; JetCAPS chai applications; Dec. 9, 2002; http://www.stethos.com/chai/data/d_us_chai.pdf.
F.D. Wright, Design Goals for an Internet Printing Protocol, Apr. 1999, pp. 1-43, http://tools.ietf.org/html/rfc2567.
R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).
T. Hastings, "Internet Printing Protocol/1.1: Model and Semantics" (Sep. 2000, retrieved from http://www.ietf.org/rfc/rfc291.txt on Sep. 18, 2008, pp. 1-210).
R. Herriot, Internet Printing Protocol (IPP): Event Notifications and Subscriptions, Jun. 21, 2004, http://tools.ietf.org/html/draft-ietf-ipp-not-spec-12, pp. 1-98.
Microsoft Corporation. Microsoft Computer Dictionary, Fifth Edition, 2002 Microsoft Press, pp. 487-488.
Gaedke, Martin et al. "A Modeling Approach to Federated Identity and Access Management", May 2005 ACM.
FOLDOC. "relational database", Jun. 2002, retrieved from <http://foldoc.org/index.cgi?query=relational+database>.
OASIS. "Security Assertion Markup Language (SAML) 2.0 Technical Overview", Working Draft 01, Jul. 22, 2004, <http://www.oasis-open.org/committees/documents.php?wg_abbrev=security>.
Hartman, Bret et al. Mastering Web Services Security, 2003 Wiley Publishing, Inc., pp. 36-46.
U.S. Appl. No. 10/962,248—Office Action dated Aug. 19, 2008.
U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.

U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498— Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
Ratha, N.K., Connell, J.H., Bolle, R.M. "Enhancing security and privacy in biometrics-based authentication systems". IBM Systems Journal 40(3), pp. 614-634 (2001).
U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588—Non-Final Office Action dated Apr. 1, 2009.
U.S. Appl. No. 11/232,588—Final Office Action dated Nov. 27, 2009.
U.S. Appl. No. 10/961,793—Non-Final Office Action dated Jun. 24, 2009.
U.S. Appl. No. 10/961,793—Final Office Action dated Feb. 4, 2010.
U.S. Appl. No. 10/961,911—Non-Final Office Action dated Jun. 8, 2009.
U.S. Appl. No. 10/961,911—Non-Final Office Action dated Feb. 3, 2010.
U.S. Appl. No. 10/962,103—Non-Final Office Action dated Aug. 14, 2009.
U.S. Appl. No. 11/232,827—Final Office Action dated Jun. 4, 2009.
U.S. Appl. No. 11/232,827—Non-Final Office Action dated Dec. 1, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.
U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/232,552—Final Office Action dated Jun. 24, 2009.
U.S. Appl. No. 11/232,552—Non-Final Office Action dated Dec. 24, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/465,722—Non-Final Office Action dated Dec. 24, 2009.
U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.
U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.

U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non- Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/218,186—Non-Final Office Action dated Jun. 23, 2009.
U.S. Appl. No. 11/218,186—Final Office Action dated Feb. 1, 2010.
U.S. Appl. No. 11/562,342—Non-Final Office Action dated May 29, 2009.
U.S. Appl. No. 11/562,342—Final Office Action dated Dec. 21, 2009.
U.S. Appl. No. 11/685,046—Non-Final Office Action dated Jul. 8, 2009.
U.S. Appl. No. 11/685,046—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.
JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.
Foreign Patent App. No. JP2006-256441—Office Action filed for a related foreign application dated Mar. 30, 2010 corresponding to U.S. Appl. No. 11/233,202.
Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/232,827—Final Office Action dated Jun. 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/465,722—Final Office Action dated Apr. 30, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/536,115—Non-final Office Action dated Jun. 15, 2010.
U.S. Appl. No. 11/218,033—Final Office Action dated May 14, 2010.
E. Uemukai Toshiaki, A WWW Browsing System in Remote Display Environments, IPSJ magazine, Information Processing Society of Japan, Publication Date: Sep. 15, 2000, vol. 41, No. 9, p. 2364 to 2373.
Foreign Patent App. No. JP2006256440—Office Action filed for a related foreign application dated Jun. 7, 2010 corresponding to U.S. Appl. No. 11/233,270.
Foreign Patent App. No. JP2006261564—Office Action filed for a related foreign application dated Jun. 15, 2010 corresponding to U.S. Appl. No. 11/241,010.
Foreign Patent App. No. JP2006207195—Office Action filed for a related foreign application dated Jul. 27, 2010 corresponding to U.S. Appl. No. 11/192,617.
U.S. Appl. No. 10/962,248—Final Office Action dated Aug. 17, 2010.
U.S. Appl. No. 10/961,594—Non-Final Office Action dated Sep. 15, 2010.
U.S. Appl. No. 11/233,202—Non-Final Office Action dated Jul. 27, 2010.
U.S. Appl. No. 11/233,201—Non-Final Office Action dated Sep. 15, 2010.
U.S. Appl. No. 11/232,552—Final Office Action dated Aug. 19, 2010.

U.S. Appl. No. 11/241,501—Final Office Action dated Jul. 22, 2010.
U.S. Appl. No. 11/241,497—Notice of Allowance dated Aug. 11, 2010.
U.S. Appl. No. 11/241,498—Final Office Action dated Jul. 22, 2010.
U.S. Appl. No. 11/192,862—Non-Final Office Action dated Jul. 26, 2010.
U.S. Appl. No. 11/192,937—Notice of Allowance dated Sep. 7, 2010.
U.S. Appl. No. 11/192,865—Final Office Action dated Mar. 4, 2010.
U.S. Appl. No. 11/192,865—Non-Final Office Action dated Sep. 2, 2010.
U.S. Appl. No. 11/192,629—Final Office Action dated Aug. 25, 2010.
U.S. Appl. No. 11/192,796—Notice of Allowance dated Sep. 10, 2010.
U.S. Appl. No. 11/256,493—Final Office Action dated Aug. 20, 2010.
U.S. Appl. No. 11/240,084—Final Office Action dated Aug. 6, 2010.
Foreign Patent App. No. JP2006205150—Office Action filed for a related foreign application dated Sep. 28, 2010 corresponding to U.S. Appl. No. 11/192,500.
Foreign Patent App. No. JP2006207198—Office Action filed for a related foreign application dated Sep. 21, 2010 corresponding to U.S. Appl. No. 11/192,836.
Foreign Patent App. No. JP2006256441—Office Action filed for a related foreign application dated Nov. 9, 2010 corresponding to U.S. Appl. No. 11/233,202.
Foreign Patent App. No. JP2006256440—Office Action filed for a related foreign application dated Oct. 19, 2010 corresponding to U.S. Appl. No. 11/233,270.
U.S. Appl. No. 10/961,793—Non-Final Office Action dated Oct. 28, 2010.
U.S. Appl. No. 10/961,911—Final Office Action dated Oct. 20, 2010.
U.S. Appl. No. 11/073,055—Non-Final Office Action dated Nov. 23, 2010.
U.S. Appl. No. 11/233,270—Notice of Allowance dated Nov. 30, 2010.
U.S. Appl. No. 11/241,010—Final Office Action dated Oct. 15, 2010.
U.S. Appl. No. 11/240,156—Non-Final Office Action dated Nov. 10, 2010.
U.S. Appl. No. 11/193,152—Non-Final Office Action dated Mar. 1, 2010.
U.S. Appl. No. 11/193,152—Final Office Action dated Nov. 18, 2010.
U.S. Appl. No. 11/193,151—Non-Final Office Action dated Mar. 29, 2010.
U.S. Appl. No. 11/193,151—Final Office Action dated Nov. 2, 2010.
U.S. Appl. No. 11/192,824—Final Office Action dated Oct. 22, 2010.
U.S. Appl. No. 11/465,747—Final Office Action dated Mar. 9, 2010.
U.S. Appl. No. 11/241,447—Non-Final Office Action dated Dec. 8, 2010.
U.S. Appl. No. 11/193,076—Final Office Action dated Jan. 6, 2011.
U.S. Appl. No. 11/192,630—Final Office Action dated Dec. 8, 2010.
U.S. Appl. No. 11/192,868—Final Office Action dated Dec. 8, 2010.
U.S. Appl. No. 11/193,188—Final Office Action dated Dec. 8, 2010.
U.S. Appl. No. 11/192,615—Non-Final Office Action dated Jan. 4, 2011.
U.S. Appl. No. 11/192,467—Notice of Allowance dated Dec. 22, 2010.
U.S. Appl. No. 11/465,747—Notice of Allowance dated Dec. 28, 2010.

* cited by examiner

METHODS AND SYSTEMS FOR IMAGING DEVICE CONTROL

RELATED REFERENCES

This application is a continuation-in-part of U.S. patent application Ser. No. 10/962,248, entitled "Methods and Systems for Imaging Device Remote Application Interaction," filed on Oct. 8, 2004; this application is also a continuation-in-part of U.S. patent application Ser. No. 10/961,793, entitled "Methods and Systems for Imaging Device Remote Form Management," filed on Oct. 8, 2004; this application is also a continuation-in-part of U.S. patent application Ser. No. 10/961,911, entitled "Methods and Systems for Imaging Device Remote Location Functions," filed on Oct. 8, 2004; this application is also a continuation-in-part of U.S. patent application Ser. No. 10/961,594, entitled "Methods and Systems for Imaging Device Remote document Management," filed on Oct. 8, 2004; and this application is also a continuation-in-part of U.S. patent application Ser. No. 10/962,103, entitled "Methods and Systems for Imaging Device Document Translation," filed on Oct. 8, 2004 now U.S. Pat. No. 7,969,596; this application also claims the benefit of U.S. Provisional Patent Application No. 60/704,066, entitled "Methods and Systems for Imaging Device Applications," filed Jul. 28, 2005.

FIELD OF THE INVENTION

Embodiments of the present invention comprise methods and systems for exposing imaging device functions to an application.

BACKGROUND OF THE INVENTION

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may contain computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

BRIEF SUMMARY OF THE INVENTION

Embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

Embodiments of the present invention comprise methods and systems for exposing imaging device functions to an application.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
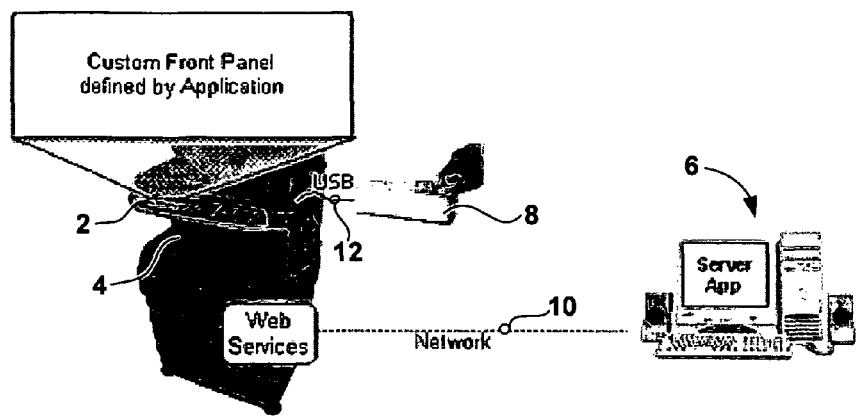
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions comprising a printer, scanner, copier and/or a facsimile machine or image transmitter/receiver, is a type of imaging device. Other MFP imaging devices may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
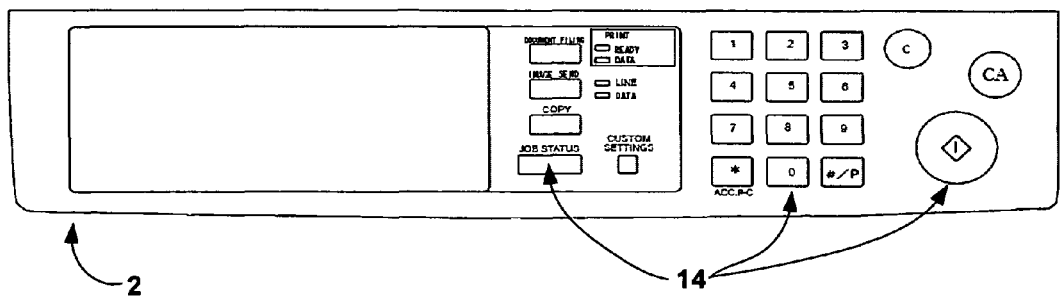
FIG. 2 is an image of an exemplary user interface for an imaging device.

Some embodiments of the present invention may be described with reference to FIGS. 1 & 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 12 or may comprise a touch panel system with or without buttons 14. User input and display may also be performed through a separate UI device 8, which may be connected to the imaging device 4 by a communication link 12, such as a USB connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Embodiments of the present invention allow network applications running on remote computing devices to interact with the user of the imaging device through the imaging device I/O panel. These embodiments allow imaging device user interface (UI) control (i.e., touch panel, button/display)

by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Embodiments of the present invention comprise network-based applications that have full control over the imaging device UI to display text and graphics in any format. In these embodiments, the application can programmatically display buttons, textboxes, graphics, etc. in any layout desired.

In some embodiments, the UI layout is easy to program using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application is able to request a keyboard UI to be displayed on the imaging device display 12, 8. In some embodiments, this functionality is available on the imaging device and does not need to be recreated by remote computing device applications. In some embodiments, the remote computing device may define the keyboard prompt and default values. These embodiments may comprise a remote computing device that is able to rename imaging device UI buttons, such as the OK and Cancel buttons as well as define additional buttons.

In some embodiments, menu templates may be served to the imaging device UI by the imaging device itself 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it checks to see if an External Authorization application is registered. If so, the imaging device is placed in disabled mode and the application is contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
|---|---|---|
| Device boots | External Application | None |
| Document Filing | External Application | None |
| Image Send | External Application | None |
| Copy | External Application | None |
| Job Status | Device - standard Job Status screens | Job Status |
| Custom Settings | Device - standard Custom Settings screens | N/A |
| OS Mode | Not available when device is disabled | |

Remote Computing Device Applications

In embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points are based on a user action ("trigger") for which applications may register. In some embodiments, applications may be registered with target devices so that the device knows that when "trigger A" occurs on the front panel to contact "remote computing device B" for instructions. In exemplary embodiments, applications may be integrated with an imaging device at any of several "trigger" points.

Remote computing devices may be registered to a specific function and contacted when that function's hardware key is pressed (e.g. Image Send) on the imaging device UI. Any UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu will be displayed with the solutions registered to that function. Users may select the desired solution and the remote computing device will be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu will be displayed with the solutions applications registered to the generic RCD mode. Users will select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
|---|---|---|
| Mode keys (Copy, Doc Filing, Image Send) and Custom Settings key | Clear current job settings, move to target screen | Clear current job settings, move to target screen |

TABLE 2-continued

Exemplary Hardware Key Assignments

| Button Press | Standard IDev Mode | RCD Mode |
|---|---|---|
| Job Status key | Move to Job Status, maintain current settings & UI location | Move to Job Status, maintain current settings & UI location |
| Clear (C) | Clears settings | Sends clear event to external application |
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |
| Number keys | Input for copy count or fax numbers | Not used |
| * | Logs user out (disable device and contact External Authorization for screens) | Logs user out (disable device and contact External Authorization for screens) |

In some embodiments, in addition to the * key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g. provide user with instructions for clearing jam).

Control Handoffs

In some embodiments, at different points throughout an imaging job, several applications may need control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself. At the end of this step, the device is enabled. The External Authorization application may also specify default parameters or disable specific job parameters (e.g. default file format is PDF, but user may change; color mode is set to B/W and user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native Image Send screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the HDD. If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job should either be authorized or canceled.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

Device Functions

| Enable/Disable | Description |
| --- | --- |
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
| --- | --- | --- | --- | --- | --- | --- | --- |
| JOB Characteristics | | | | | | | |
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics | | | | | | | |
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1 - Yes when Document Filing is used

Debit mode—in these embodiments, when an application enables the device it may specify if the current job requires authorization. If so, the job will be spooled to memory and click information (e.g., as defined in Table 4) will be sent to an RCD. An RCD will then notify the device if the job should be deleted or output/sent. At this point, the application also has the option of changing job parameters. If the application does not require authorization, the job will continue as normal and a click report will be sent at the end of the job.

Print job accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or cancel the job.

Report on unidentified jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the imaging device. In exemplary embodiments, the Device Management API may provide an RCD with the following controls:

Device status—an RCD may request the current status of the device. This is the same status information as reported on the embedded web pages.

Device configuration—an RCD can retrieve a list of installed options supported by the device.

Web Page settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click counts—an RCD application can retrieve device total counts and clicks for each function by account code.

Data Security settings—an RCD application may retrieve the status information on the DSK (e.g. last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security", and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form Management API, which allows an RCD application to remotely download and manage fonts and forms in mass-storage. In some exemplary embodiments, a Font and Form Management API may provide a remote computing device with the following controls:

Mass storage control—an RCD application can retrieve mass storage status information including storage capacity, space available, and write-protect mode plus modify write-protect status.

Resource list—an RCD application can retrieve a list of stored fonts and forms including font or macro ID, font number, font/form name, escape sequence, and file size.

Download resource—an RCD application can download PCL fonts, PCL macros, and PS fonts and forms. Any special processing that is performed when a resource is downloaded via the web pages will also be performed when the resource is downloaded via Open Systems.

Delete resource—an RCD application can delete any resource stored in mass storage.

Upload resources—an RCD application can upload an individual or all resources. On devices where effective memory management is unavailable, a server application can use this function to "defrag" mass storage.

Font/macro ID's—an RCD application can assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

Firmware versions—an RCD application can retrieve the current firmware version numbers.

Service mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.

Update firmware—an RCD can download an updated firmware version to the device. If a reboot is necessary, the IDev will perform it automatically when download is complete.

Download status—the IDev will send a status notification (success/error) to an RCD after firmware download.

Revert to previous version—if firmware update is not successful, the application can request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

Image Send Parameters—a remote computing device application can get and set values for the following scan and fax parameters:

COLOR OR B/W

IMAGE MODE—TEXT, TEXT/PHOTO, PHOTO; EXPOSURE LEVEL

RESOLUTION

FILE FORMAT—FILE TYPE, COMPRESSION, AND PAGES PER FILE

ORIGINAL—ORIGINAL SIZE, SIMPLEX/DUPLEX, ROTATE, AND JOB BUILD

FILENAME

SUBJECT

MESSAGE

SENDER

SCHEDULE SEND TIME

PAGE DIVISION (BOOK SCANNING)

COVER PAGE

TRANSMISSION MESSAGE (CONFIDENTIAL, URGENT, ETC.)

THIN PAPER SCANNING

DESTINATION

DOCUMENT FILING

Initiate Scan—the remote computing device application can initiate the scan function (same as user pressing start button).

In some embodiments, a remote computing device can change the default values on the imaging device or the values for the current job. For the current job, the remote computing device may also specify if scan parameters may be modified by the user or not. If one remote computing device application (e.g. Access Control) specifies that a parameter cannot be changed and then a second application (e.g. Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

PJL sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

Copy Parameters—an RCD application can get and set values for the following copy parameters:

COLOR OR B/W

EXPOSURE—TEXT, TEXT/PHOTO, PHOTO, SUPER PHOTO; EXPOSURE LEVEL

PAPER SELECT (BY TRAY)
COPY RATIO
2-SIDED COPY—1TO1, 1TO2, 2TO2, 2TO1; BINDING EDGE
OUTPUT—OUTPUT TRAY, SORT, STAPLE, GROUP, OFFSET
ORIGINAL SIZE
SPECIAL FUNCTIONS—MARGIN SHIFT, ERASE, PAMPHLET, ETC.
DOCUMENT FILING

Initiate Copy—an RCD application can initiate the copy function (same as user pressing start button).

In some embodiments, a remote computing device can change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

Backup/restore—the remote computing device application can import and export a batch file with all Document Filing data. In some embodiments, this package will be in a proprietary format since it contains documents that are password-protected and should not be accessed individually—this is typically for restore in case of failure or cloning to other devices.

File/folder list—the remote computing device application can retrieve, modify, and create new files and folders to be stored on the IDev (also covered in device management).

Download file—the remote computing device can download a new file to the Document Filing systems and specify folder, filename, username, and password.

User list—the remote computing device application can retrieve, modify, and create new users to be stored on the IDev (also covered in device management).

HDD Status—the remote computing device application can retrieve the current HDD status including the % allocated to the main folder, quick folder, and custom folders and the % remaining.

Doc Filing Parameters—the remote computing device application can get and set values for storing a file to Doc Filing including:
EXPOSURE
RESOLUTION
ORIGINAL—SIZE, SIMPLEX/DUPLEX
FILE INFORMATION—USERNAME, FILENAME, FOLDER, CONFIDENTIAL, PASSWORD
SPECIAL MODES—ERASE, DUAL PAGE $C_{opy}$, 2IN1, JOB BUILD, CARD SHOT Initiate Print—the remote computing device application can select a stored file and initiate a print including the following parameters:
PAPER SIZE/SOURCE
OUTPUT—SORT/GROUP, OUTPUT TRAY, STAPLE, PUNCH, OFFSET
SIMPLEX/DUPLEX(TABLET/BOOKLET)
TANDEM PRINT
NUMBER OF COPIES
DELETE OR STORE AFTER PRINTING Initiate Send—the remote computing device application can select a stored file and initiate a send including the following parameters:
RESOLUTION
FILE FORMAT
DESTINATION
TIMER
SENDER
FILENAME
SUBJECT
MESSAGE Security Allowing external applications to control an imaging device opens up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments provide extensive access and control of the imaging device, which poses a significant security risk. The interface of these embodiments may be protected from access by attackers, while maintaining ease of setup and use for valid solutions.

Confidential data (user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is contract with it to ensure an intruder cannot imitate the imaging device to collect network configuration and password information, monitor file/folder structures of a document management system, or spoof security settings and DSK status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g. someone disconnects network cable), the imaging device may immediately be disabled and an error message displayed.

An administrator may be able to adjust a security level based on company and application requirements. Security requirements can have a large impact on the time it takes to develop a remote computing device application and the resources required to implement the solution. Users using some embodiments may range from a small business with one imaging device, no IT staff, and a simple scan or print application to a large government office using access control and audit trails to track all device activity. The security measures used to protect imaging device interfaces may be adjustable by the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Some embodiments of the present invention may be described with reference to FIG. 3. These embodiments comprise an imaging device only, which is configured to interact with a remote computing device, such as a server through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

Imaging device 30 will typically be capable of performing one or more imaging functions including, but not limited to, scanning, printing, copying, facsimile transmission (sending and receiving) and others.

Figure 3:
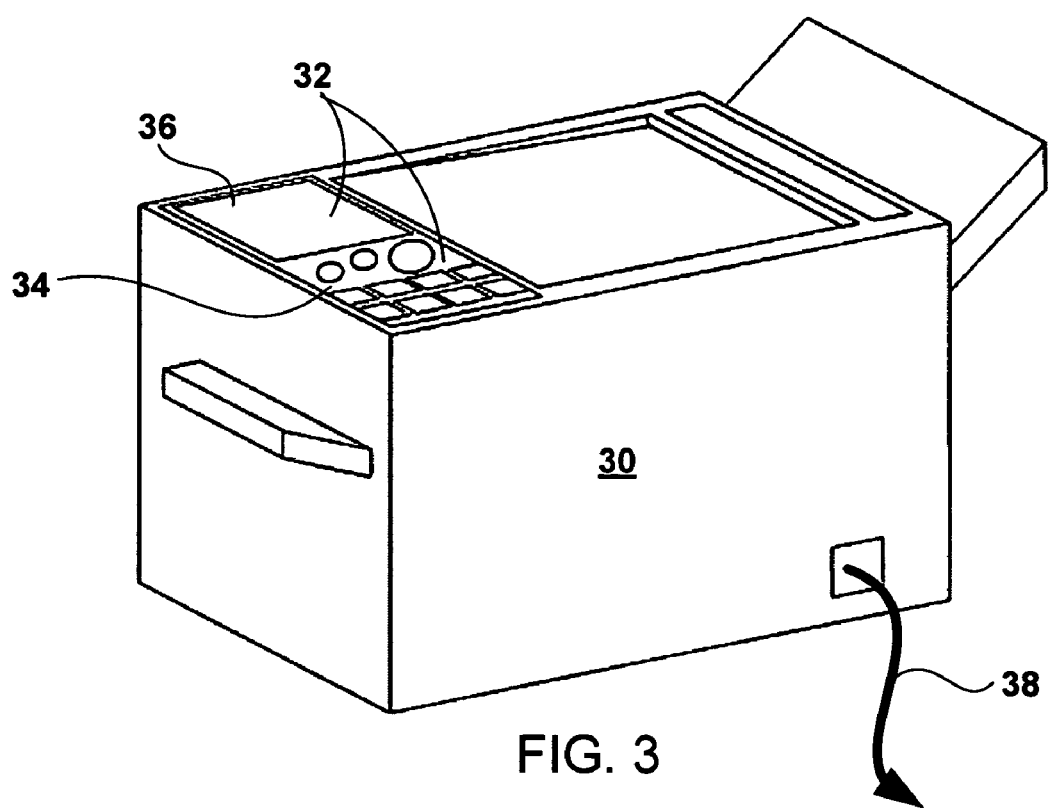
FIG. 3 shows an exemplary imaging device.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug® connection or other wired connections. HomePlug® is a trademark of the HomePlug Powerline Alliance, which is an industry trade group that defines power line communication specifications. Alternatively, the communications link 38 may comprise a wireless connection, such as an IEEE 802.11(b) compliant connection, a Bluetooth connection, an Infrared Data Association (IrDA) connection or some other wireless connection.

Figure 4:
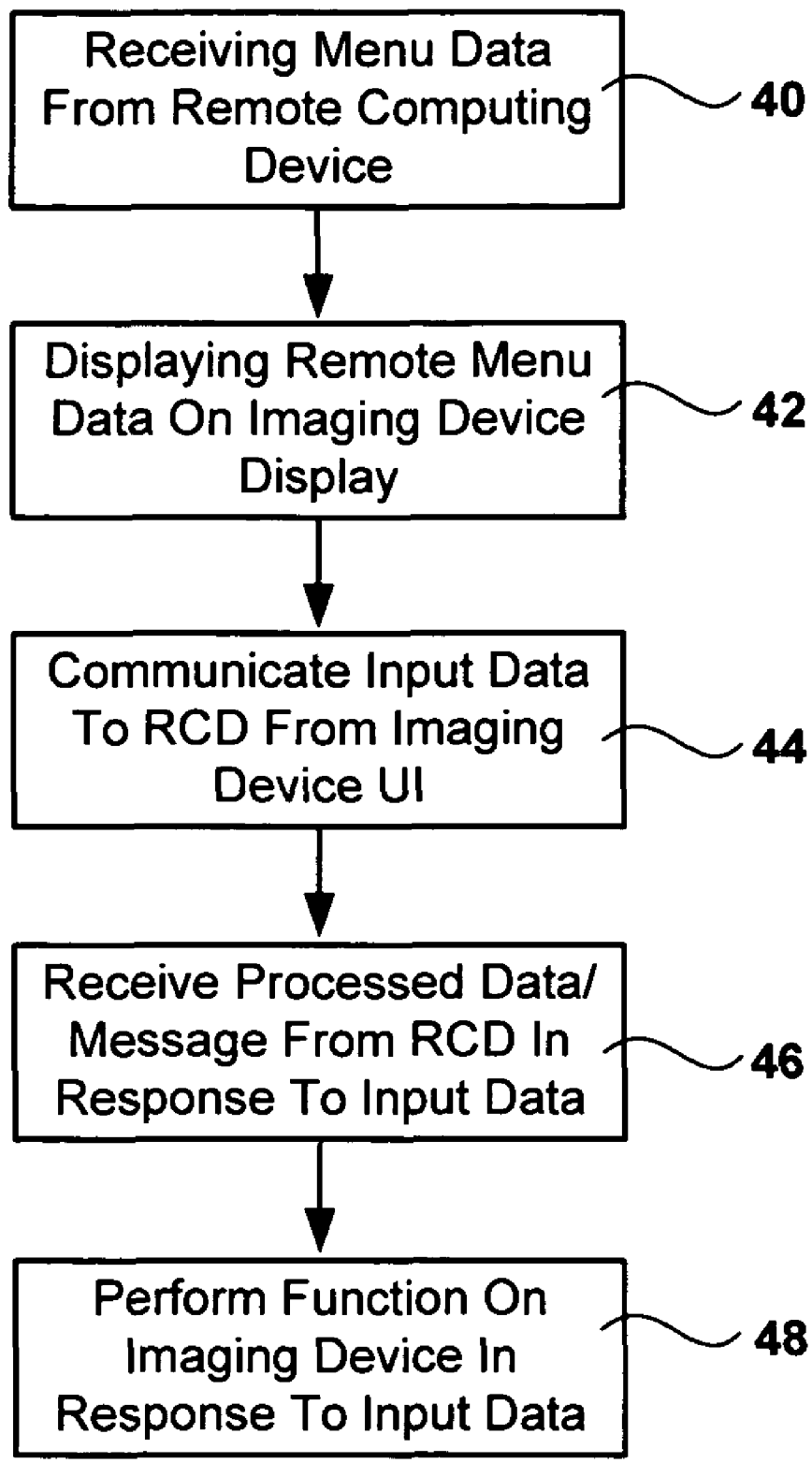
FIG. 4 is a chart depicting steps of an imaging device method.

The operation of some imaging device embodiments may be explained with reference to FIG. 4. In these embodiments, menu data is received 40 from a remote computing device (not shown in FIG. 3), which is connected to the imaging device 30 via the communication link 38 through a wired or wireless connection. This menu data is then displayed 42 on the imaging device user interface display 36. This display of remote menu data is intended to prompt a user to make an input on the user interface input device 34.

Imaging devices of these embodiments are further configured to accept input from a user in response to a display of remote menu data and communicate 44 that user input to a remote computing device. In some embodiments, this user input data will be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (i.e., scanning, copying, printing, fax transmission) on the imaging device in response to the receipt 46 of processed data.

Figure 5:
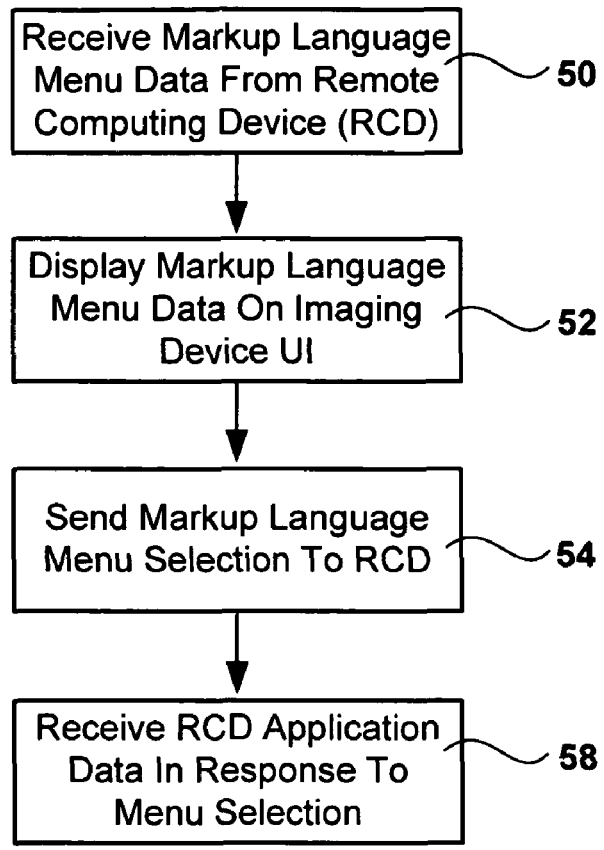
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data is typically intended to prompt user input on imaging device user interface 32. Display 52 of the remotely-stored menu data may be accomplished with a browser application that is native to the imaging device 30.

In these embodiments, the imaging device 30 is further configured to route 54 user input received though its user interface 32 to a remote computing device. The remote computing device that receives the user input may then run an application or otherwise process the user input and return the results of the processing to the imaging device 30. Accordingly, the imaging device 30 is further configured to receive 56 processed data from a remote computing device. In some embodiments, the imaging device 30 may perform one or more functions in response to the receipt 56 of processed data.

Figure 6:
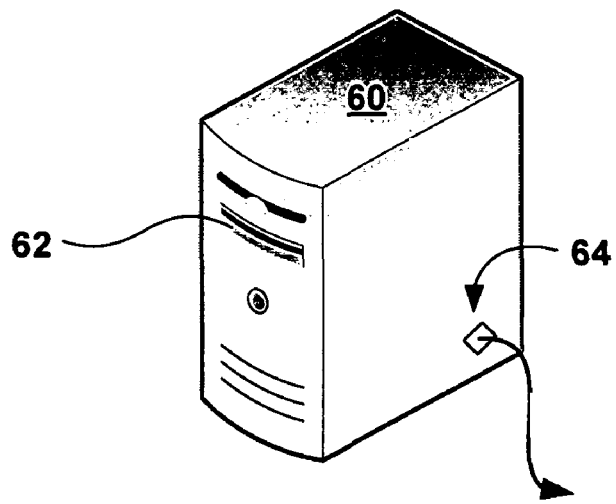
FIG. 6 shows an exemplary remote computing device embodiment.

Some embodiments of the present invention may be explained with reference to FIG. 6. These embodiments comprise a remote computing device (RCD) 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IrDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
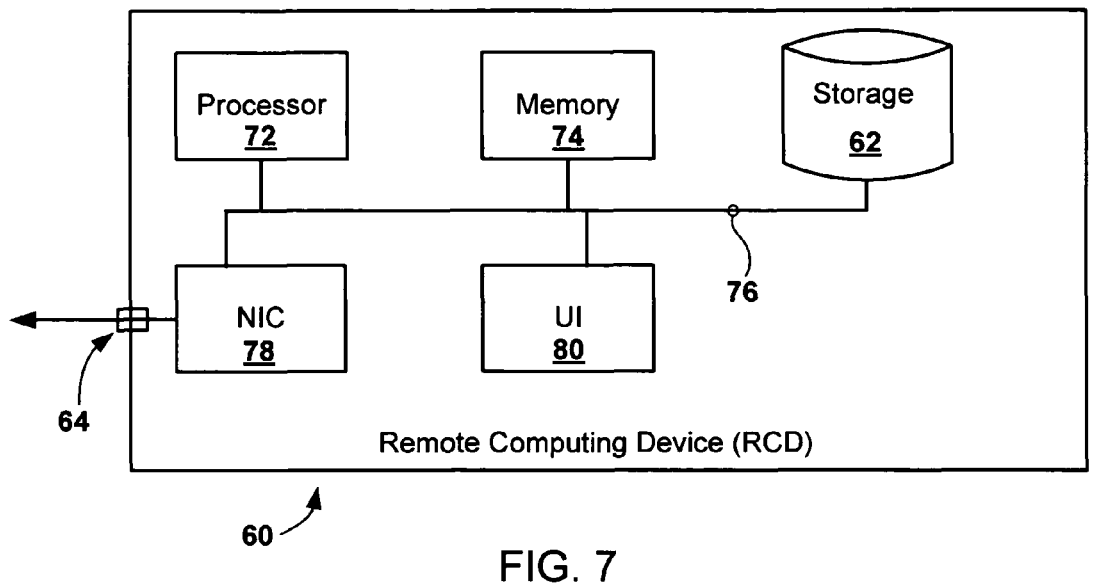
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. RCD 60 may further comprise memory 74, which may be in the form of Random Access Memory (RAM) and Read Only Memory (ROM). Generally, any applications processed by processor 72 will be loaded into memory 74. RCD 60 may further comprise a network interface 78, which allows RCD 60 to communicate with other devices, such as an imaging device 30. In some embodiments, RCD 60 may also comprise a user interface 80, but this is not required in many embodiments. Storage 62 may be used to store applications and data that may be accessed by an imaging device 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
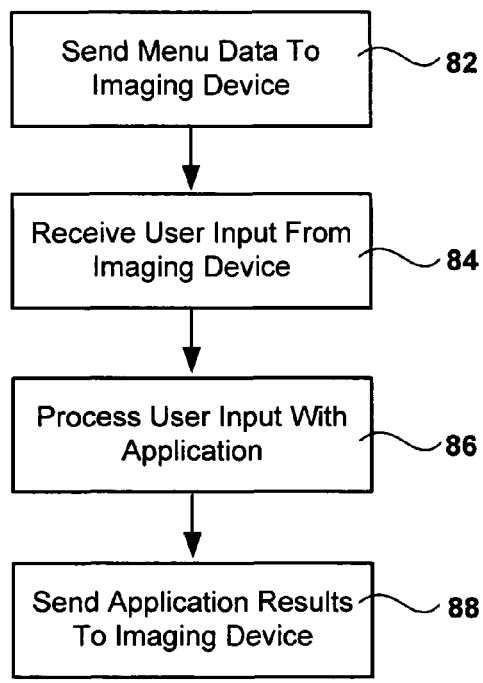
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device is stored on RCD 60.

An RCD 60, of some embodiments, will be further configured to receive 84 user input obtained through the user interface 32 of an imaging device 30 and transferred to the RCD 60 over communications links 38 & 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
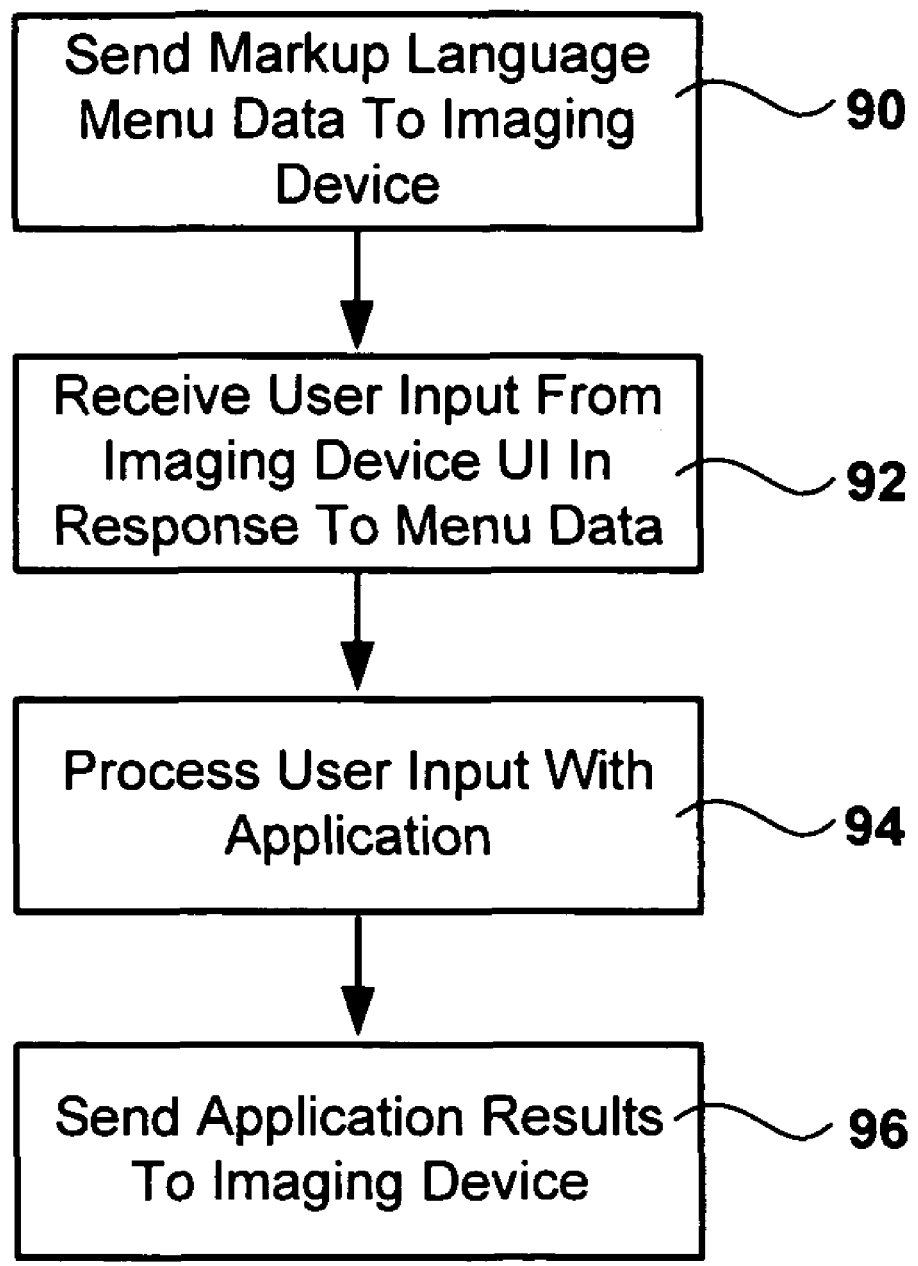
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data is then received at the imaging device 30 and displayed to a user. Typically, this will prompt the user to enter an input on the imaging device user interface 32. This user input will then be sent by the imaging device 30 to the RCD 60. The RCD 60 will then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
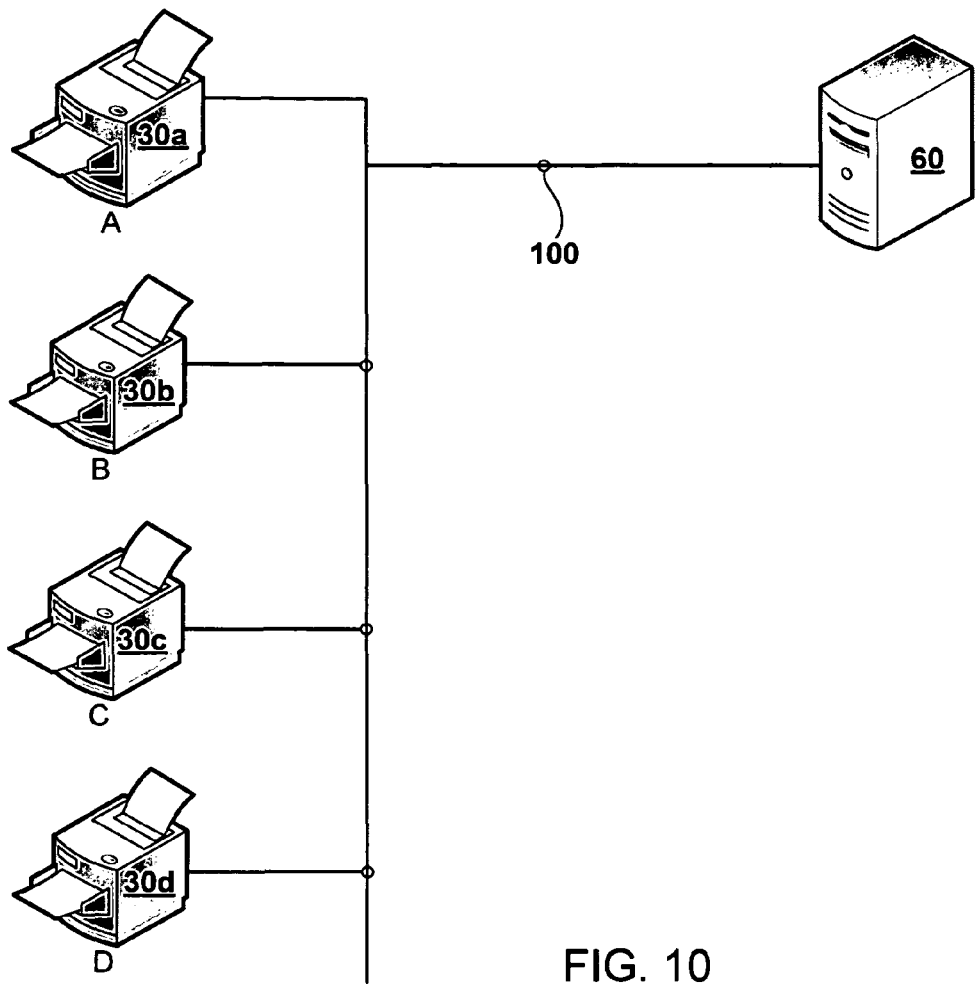
FIG. 10 is a diagram showing a system comprising multiple imaging devices in connection with a remote computing device.
Figure 11:
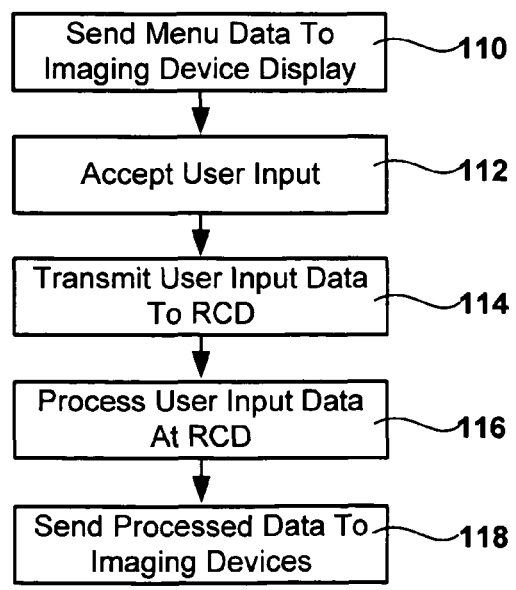
FIG. 11 is a chart showing steps of a method comprising RCD processing of user input data.

Some embodiments of the present invention may be described with reference to FIGS. 10 & 11. These embodiments comprise at least one RCD 60 and a plurality of imaging devices 30*a*-30*d*. In these embodiments, at least one of the imaging devices 30*a*-30*d* comprises a user interface 32 with a display 36 and user input panel 34 that is integral with the display (i.e., touch-screen) or a separate input unit. RCD 60 is connected to imaging devices 30*a*-30*d* by a communications link and network 100 to enable data transmission between RCD 60 and imaging devices 30*a*-30*d*.

In these embodiments, menu data is stored on RCD 60 and sent 110 to at least one of the imaging devices 30*a*-30*d* where the menu data is displayed on a user interface. Any of Imaging devices 30*a*-30*d* that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30*a*-30*d*.

In these embodiments, a single RCD 60 may be used to provide processing power, resources and functionality to a plurality of imaging devices 30*a*-30*d* without reproducing these resources in each imaging device. In some embodiments, data generated by input on one imaging device 30*a* may be directed to another imaging device 30*d* for processed data output or final processing.

Event Notification Subscription Embodiments

Embodiments of the present invention provide systems and methods for notification techniques between an imaging device (IDev) and an application, which may be local or on a remote computing device (RCD). These notification methods and systems may be used for error reporting and other purposes. Applications may receive these notifications by subscribing to a notification application on an IDev. The IDev may then notify an application when a specific event occurs on the IDev or an associated device.

In some embodiments, subscribing to an event may comprise making a call to an IDev Web Service and identifying an event for which notification is desired. In some embodiments, an application may, additionally, subscribe to an event within the context of a single job or globally (for all jobs). In some exemplary embodiments, an application may expose a web service of its own through which the IDev may send notifications.

In some embodiments, receiving an event notification may comprise implementing a web service through which to receive event notifications. In some embodiments, a web service or another application may be used to subscribe to an event notification process. A web service or another application may also be used to process event data when an event occurs. In some embodiments, an event method may be called any time an event occurs. An event method may also be job-specific wherein it only sends a notification message during a specific job. In some embodiments, an "eventdata" parameter may be used. The eventdata parameter may comprise a structure containing event specific data, such as a job identifier, user credentials, and/or other data.

In some exemplary embodiments, an application may subscribe to an error notification process that is triggered by an error of some type in the IDev system. In some of these embodiments, this may be described as an ON_SYSTEM_ERROR event. An error condition may be triggered by several factors. In some exemplary embodiments, an error condition may be triggered by an "out of paper" condition which has stopped a print process, or, in the case of a scan job, a "document not found" condition in the input tray.

In some exemplary embodiments, which comprise a web service, an event trigger may comprise application-provided configuration data that is syntactically and semantically valid in terms of the Web Service Description Language (WSDL) and overall rules, but is still not valid. For example, a user may configure a fax operation and specify a fax number which is not a valid phone number.

In some embodiments of the present invention, an application or device that wants information relating to IDev activity may request from the IDev a list of events for which the IDev is capable of sending notifications. These events may be related to native functions and/or applications or may be related to remote applications, which are in communication with the IDev. In some embodiments, a subscribing application may use a SOAP method GetServiceEventElements to obtain a list of event elements for which an IDev notification application is capable of sending notifications. Once the list of available notification events is known, a subscribing application may request a subscription to an event on the list. An IDev notification application may then record the notification request in a notification record and notify the subscribing application if the event occurs.

Some embodiments of the present invention comprise processes that may be implemented as Web Service methods. Some of these processes are referred to by specific names that are used in exemplary embodiments. These names may be related in a syntax using the name followed by a closed set of parentheses (i.e., Event( ), CreateJob( ), Authenticate( )). A description of an exemplary embodiment comprising these methods and their functions and attributes is found in Appendix A.

In some embodiments of the present invention, a notification application may be based on a subscription model, where local or network applications that wish to receive notifications may subscribe in advance to events with a given IDev. In some embodiments, an IDev may implement a subscribers list and manage it. This may be done through a web service. In these embodiments, event notifications may be messages that may be sent to subscribing applications when certain conditions take place on the IDev.

In some embodiments, a purpose of the event notification process may be to allow remote clients to receive information about events that take place on the IDev or an associated device during execution of a specific job. In these embodiments, a job-specific subscription may be requested for which notification only occurs while the specific job is executing. In an exemplary embodiment of the present invention, an IDev notification application may send a Hello( ) SOAP request to a registered application of External Authority (subscribing application) each time a new application is registered with the IDev or each time an application is removed from the list on a given IDev, such as an MFP.

Embodiments may comprise events that an application has subscribed to being associated with a specific job ticket. These "per job ticket" subscriptions may remain valid for the lifespan of the job ticket. When a particular job ticket instance expires, the subscription associated with it may also expire. This type of subscription may be used by a standard user application. By subscribing to an event on a per-job-ticket basis, the subscriber may be notified about the event within the context of the client's job. Subscription to a per-job-ticket event will expire when the job ticket expires. A per-job-ticket subscription embodiment is a sub-set of the broader job-specific subscription embodiments.

Some embodiments of the present invention may define a notification mechanism to be used for notifying a subscribing application about eligible events that take place on the IDev or an associated application or device. In some embodiments, a notification mechanism may be specified by the subscribing application when a notification request is made or at some time before the actual notification occurs.

Some embodiments of the present invention comprise access control in which a notification application requires credential authentication prior to granting a notification subscription. In these embodiments, a notification request may comprise a user credential or may be followed up with a user credential to authenticate the user. The notification application may process the credential or send it to a remote authentication application for processing. Only when the credential is successfully authenticated will the subscription request be granted. In some embodiments, only certain types of subscription request may require access control and credential authentication. For example, a global subscription request (for all jobs on an IDev) may require authentication while a job-specific subscription request may not require authentication.

In some exemplary embodiments of the present invention, an IDev notification application may run under a secure access mode. In this mode a request from a subscribing application may contain a SOAP header comprising a security element of type SECURITY_SOAPHEADER_TYPE. This element may contain user or account credentials. In some exemplary embodiments the request may comprise some or all of the following XML or SOAP elements:

```
<?xml version="1.0" encoding="utf-8"?>
<S:Envelope xmlns:S="http://www.w3.org/2001/12/soap-envelope">
<S:Header>
<Security>
<Credentials>
<account-id>adent</account-id>
<metadata>
<password>42isgood</password>
</metadata>
</Credentials>
</Security>
</S:Header>
<S:Body>
<EnableDevice generic="1.0" xmlns="urn:schemas-sc-jp:mfp:osa-1-1">
<acl>
<mfp-features groupId="1234">
<user-info>
<account-id>fprefect</account-id>
</user-info>
<mfp-feature xsi:type="MFP_FEATURE_SCAN_TYPE" allow-use="on"/>
<mfp-feature xsi:type="MFP_FEATURE_COPY_TYPE" allow-use="on"/>
<mfp-feature xsi:type="MFP_FEATURE_PRINT_TYPE" allow-use="on"/>
<mfp-feature xsi:type="MFP_FEATURE_FAX_TYPE" allow-use="on"/>
<mfp-feature xsi:type="MFP_FEATURE_DOCFILING_TYPE" allow-use="on"/>
<mfp-feature xsi:type="MFP_FEATURE_CUSTOM_SETTINGS_TYPE" allow-use="off"/>
<mfp-feature xsi:type="MFP_FEATURE_ADMIN_TYPE" allow-use="off"/>
</mfp-features>
</acl>
</EnableDevice>
</S:Body>
</S:Envelope>
```

In further exemplary embodiments, a response message may be sent back that may comprise the following XML or SOAP elements:

```
<?xml version="1.0" encoding="utf-8"?>
<S:Envelope xmlns:S="http://www.w3.org/2001/12/soap-envelope">
<S:Body>
    <EnableDeviceResponse generic="1.0"
    xmlns="urn:schemas-sc-jp:mfp:osa-1-1"/>
</S:Body>
</S:Envelope>
```

In some embodiments of the present invention, account credentials may be provided which may contain information about the user and application, such as the user login name and password. User or application account credentials may be provided inside a SOAP header element. The account credentials may be provided inside a CreateJob( ) request or inside the PJL stream. The original caller account credentials may be submitted as one of the parameters in this request. Credentials may also be sent in a separate message or message exchange.

In an exemplary embodiment of the present invention, a message containing user account data information may comprise the following XML elements:

```xml
<?xml version="1.0" encoding="utf-8"?>
<S:Envelope xmlns:S="http://www.w3.org/2001/12/soap-envelope">
<S:Header>
<wsse:Security
xmlns:wsse="http://schemas.xmlsoap.org/ws/2002/07/secext"
S:mustUnderstand="1">
<wsse:UsernameToken>
<wsse:Username>bschacht</wsse:Username><wsse:Password
Type="PasswordText">ILoveHorses</wsse:Password>
</wsse:UsernameToken>
</wsse:Security>
</S:Header>
<S:Body>
<m:CreateJob generic="1.0"
xmlns:m="urn:schemas-sc-jp:mfp:osa-1-1">
</m:CreateJob>
</S:Body>
</S:Envelope>
```

Some embodiments of the present invention may comprise an Access Control List (ACL). The ACL may comprise information about the permissions of each IDev user, IDev resources, and/or remote applications. A remote application, such as an External Authority (described below), may maintain the ACL and may provide it to a plurality of IDevs on the network. The External Authority or another application may return the ACL in response to an Authenticate( ) request from the IDev, or as a parameter in an EnableDevice( ) request sent to the IDev. The External Authority may send the EnableDevice( ) request when it does not receive the Authenticate( ) request from the IDev. If a user starts a job from the operation panel interface, the IDev may not send the Authenticate( ) request. The ACL response message may contain instructions on IDev features that should be enabled or disabled for the requested account. If the method returns successfully, but without the ACL element, the MFP may interpret this to mean that the credentials are valid and may enable all features for the user. In case of an error, the MFP may return a fault element to the requesting application.

In some exemplary embodiments, only the IDev and the External Authority application may use this method. The IDev may implement the client side of this method and take the credentials and JobId data types as parameters. The purpose of this request may be to allow the External Authority to authenticate the user credentials and allow or disallow access to IDev features. This method may be reserved for exclusive use between the IDev and the registered External Authority application. The IDev may implement the client side of this method, while the application may implement the server side.

In some embodiments, applications with administrator level credentials or other qualifications may be allowed to subscribe to events on a global basis, e.g. without a need to provide a job ticket at time of subscription. This type of subscription may never expire. In these embodiments, events may be fired when a particular condition takes place on the IDev. This type of global subscription may be used by applications such as an accounting application or an external authority, application that may subscribe once to certain types of events and may receive notification from the IDev when an actual condition takes place for any job or job ticket executing on the IDev. In these embodiments, subscription to an event may never expire. In some exemplary embodiments, the best time to subscribe to an event on a global basis may be at the time the application discovers an enabled IDev device on the network.

In some embodiments of the present invention, an IDev may be configured to operate under the supervision of an "External Authority" application that may have been assigned an exclusive decision-making role. An "External Authority" application may monitor or control the processes on the IDev. As such, it may provide system enable or disable decision-making. When an IDev runs under the control of such an application, the IDev features may remain disabled until enabled by the External Authority. The enable signal may come from such an External Authority application when the user account credentials have been positively validated. This type of application may also provide access control features to the IDev and may enable or disable specific features of the IDev based on the credentials submitted. The IDev may be configured to run under the control of only one External Authority application. If configured to operate with an External Authority, the IDev may only execute jobs submitted by that External Authority application or that have been authorized by that External Authority.

In some embodiments of the present invention, an IDev may be configured to operate either as an uncontrolled native IDev, that is, with no "external authority," or to operate under the control of an "external authority." When an IDev operates as an uncontrolled native machine, all of its features may be enabled by default. On the other hand, when an IDev is configured to operate under the control of an External Authority, all of the features may be disabled by default. The External Authority application may then enable specific IDev features based on the user provided credentials.

In some exemplary embodiments, An IDev may provide a configuration page for registering an application that can be accessed only by administrators. An administrator may configure the external authority application to implement at a minimum the following methods of the MFPCoreWS interface: the server side of the Hello( ) method, the server side of the Authenticate( ) method, the server side of the Authorize( ) method, and the client side of the Enable Device( ) method. An administrator may also configure the external authority application to implement: the client side of the Subscribe( ) method, the server side of the Event( ) method, and if the external authority application needs to control the operation panel, the client side of the ShowScreen1( ) and ShowScreen2( ) requests.

In some exemplary embodiments of the present invention, remote applications may subscribe/unsubscribe to/from event notifications by sending a Subscribe SOAP request message to the IDev. The "action" parameter in this SOAP request defines the action. If the value of the "action" parameter evaluates to "true" then the meaning of this SOAP request is to subscribe to a particular event, otherwise it is an unsubscribe request. In some exemplary embodiments, a remote application may subscribe to an event by sending a Subscribe( ) SOAP request with the action field set to true. To un-subscribe from an event notification, a remote application may send the Subscribe( ) SOAP request again with the action field set to false.

In other embodiments of the present invention, applications, such as an accounting service may subscribe to certain events of interest on a global basis, without specifying a job ticket. By doing so, the overall application interaction with the IDev service may be simplified.

In some embodiments of the present invention, the lifetime of a subscription entry may depend on several factors. The most basic case is when the subscription record is removed from the subscriber list via a specific user request to unsubscribe, as shown earlier. If a subscription request to an event has been made on a per-job basis, then the subscription may expire automatically when the job object itself ceases to exist.

In an exemplary embodiment, a web service method, such as the MFPCoreWS framework, may remove any references in the subscriber's database when a job has been cancelled. If a subscription request to an event has been made on a global basis, the subscription record may never expire. The MFP-CoreWS framework will not remove it from the subscriber's database. The only way to remove it from the list may be to specifically request removal of this record to the application that initially subscribed to a given event. Records in the subscriber's database may not be persistent. In this case, when the device powers down all subscription records may be lost and no notifications of that fact will be sent to the original subscribers.

In some embodiments of the present invention an IDev may send event notifications to subscribing applications. These event notifications may comprise notifications triggered by events related to IDev functions, IDev applications and remote applications. Some exemplary events comprise job creation, the beginning of job execution, the end of job execution, job cancellation, job termination, job abortion, user login, user logout and many other events.

In some exemplary embodiments, the IDev may send a ON_JOB_CREATE event notification when a remote application successfully creates a new job using the CreateJob( ) method. The IDev may send a ON_JOB_EXECUTE event when a remote application issues a ExecuteJob( ) request and the job begins executing successfully on the IDev. The IDev may send a ON_JOB_CANCEL event when a remote application issues a CancelJob( ) request. The IDev may send a ON_JOB_CLOSE event when a remote application issues a CloseJob( ) request and the job begins executing successfully on the IDev. The IDev may send a ON_JOB_ABORT event to registered applications when the user terminates a job from the IDev operation panel using the Job Status mode. The IDev may send an ON_JOB_STARTED event to a subscribing application when an operation panel initiated job begins executing on the IDev. The IDev may send an ON_JOB_COMPLETED event when an IDev initiated job stops executing on the IDev for any reason, including successful completion of a job or an error condition that caused the job to stop.

This ON_JOB_COMPLETED event may provides registered subscribers with the reason this job stopped, such as successful completion or an error condition. In addition, the ON_JOB_COMPLETED event may contain job configuration information and the JobResults data structure to provide the IDev resource use details of this job. The IDev may send an ON_USER_LOGOUT event to subscribing applications when a user logs out from the IDev at the operation panel. The sequence that the user executes to log out from the IDev may be specific to the IDev itself. The actual action that causes the user log-out event may be device specific, and as such, is of no concern to the monitoring application. In any case, when the monitoring application receives the ON_USER_LOGOUT event it means that the currently logged-on user session with the IDev has terminated. The IDev may generate this event type when the user executes the log-out sequence on the IDev operation panel or when the session times out. This may be the IDev automatic logout when the user has abandoned the machine.

In some embodiments, an IDev may send a notification when a specific IDev hardware key is pressed. The IDev may send an ON_HKEY_PRESSED event notification to subscribers when a hardware key is pressed. In some embodiments, this may occur when one of the keys of type E_MFP_KEY_ID_TYPE has been pressed by the user on the IDev. This event may be triggered by pressing the KEY_COPY, KEY_IMGSND, KEY_PRINT, KEY_FAX, KEY_DOC_FILING, KEY_JOB_STATUS, KEY_CLEAR_ALL, KEY_SPECIAL_FUNCTIONS, KEY_CUSTOM_SETTINGS, or KEY_PROGRAM keys. The IDev may send an ON_SYSTEM_READY event to subscribing applications when an IDev system component becomes ready for operation. The IDev may also send an ON_SYSTEM_ERROR event to subscribing applications when an internal system error occurs on the IDev such as a paper jam, the IDev is out of paper, and so on. The application may then acquire more specific information about the problem by issuing a GetDeviceStatus( ) request.

In other embodiments of the present invention, an event notification may comprise some information when sent to a subscriber. The information attached to the event notification may be provided by the MFPCoreWS framework inside an <event-data/> element. This element may have two parts, of which one part may include a Header segment. In some embodiments, the information in this segment may not be event-type specific and may be provided in all event types. In an exemplary embodiment, this segment may contain the following information: account information, which is represented via the <user-info/> element and the device information that is represented via the <device-info/> element. These elements may be represented in the following format: <user-info>, <account-id>bplewnia</account-id>, </user-info><device-info uuid="SN0F21F359-AB84-36D110E6D2F9MNAR-650">, <serial-number>0F21F359-AB84-36D110E6D2F9</serial-number>, <modelname>AR-650</modelname>, <location>DS Engineering Dept—Japan</location>, <mac_address>90:EF:0F:21:2A:36</mac_address>, <network_address>1.2.3.4</network_address> and </device-info>.

Some embodiments of the present invention may include elements with a second event specific segment. In these embodiments the content of this segment may be event type and job-type specific. The information in this segment may be contained within the <details/> element.

In further embodiments of the present invention, the notification message may be delivered to a subscribing application in more than one way using a variety of mechanisms. In some embodiments, the following transport mechanisms for event message delivery may be used: SOAP, using a notification method, such as the Event( ) method; E-MAIL, where the body of the message will be the notification; HTTP-GET, HTTP_POST, using the HTTP POST mechanism to deliver the event data to subscribers; and RAW 2.0 protocol, a Sharp notification mechanism. An application may designate the event delivery mechanism at the time of subscription.

Figure 12:
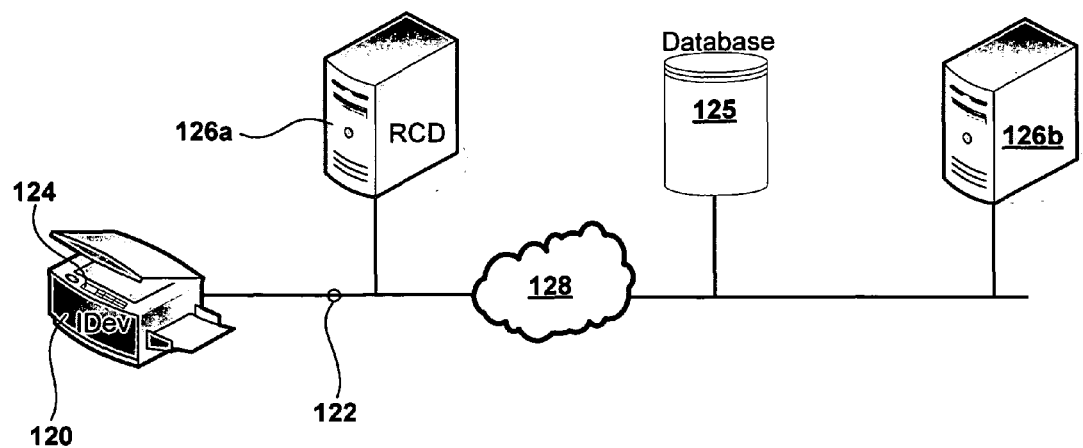
FIG. 12 is a diagram showing components of some embodiments comprising linked resources.

Some embodiments of the present invention may be described with reference to FIG. 12. In these embodiments, an imaging device (IDev) 120 comprises a user interface 124, which is capable of receiving user input and displaying data to a user. The user interface 124 will typically comprise a display, often in the form of a touch panel. The display may be used to display data to a user. This data may comprise menu data to prompt for a user selection or data entry, such as a user ID and password, form selection or some other input. The imaging device 120 has a communication link 122, which may comprise a typical computer network connection, a serial cable or some other wired or wireless communication link as described in other embodiments. The communication link 122 may connect the imaging device 120 to a remote computing device (RCD) 126a, 126b, such as a server. The RCD 126a, 126b may be used to store documents, such as forms, and other data and make that data accessible from the imaging device 120. The RCD 126a, 126b may also execute applications that interact with or receive input from the imaging device 120 and its user interface 124. In some embodiments, a database 125 may be linked to the imaging device 120 and/or an RCD 126a, 126b. In some embodiments, an RCD 126b or database 125 may be connected to an IDev 120 over a wide area network such as the internet 128.

Figure 13:
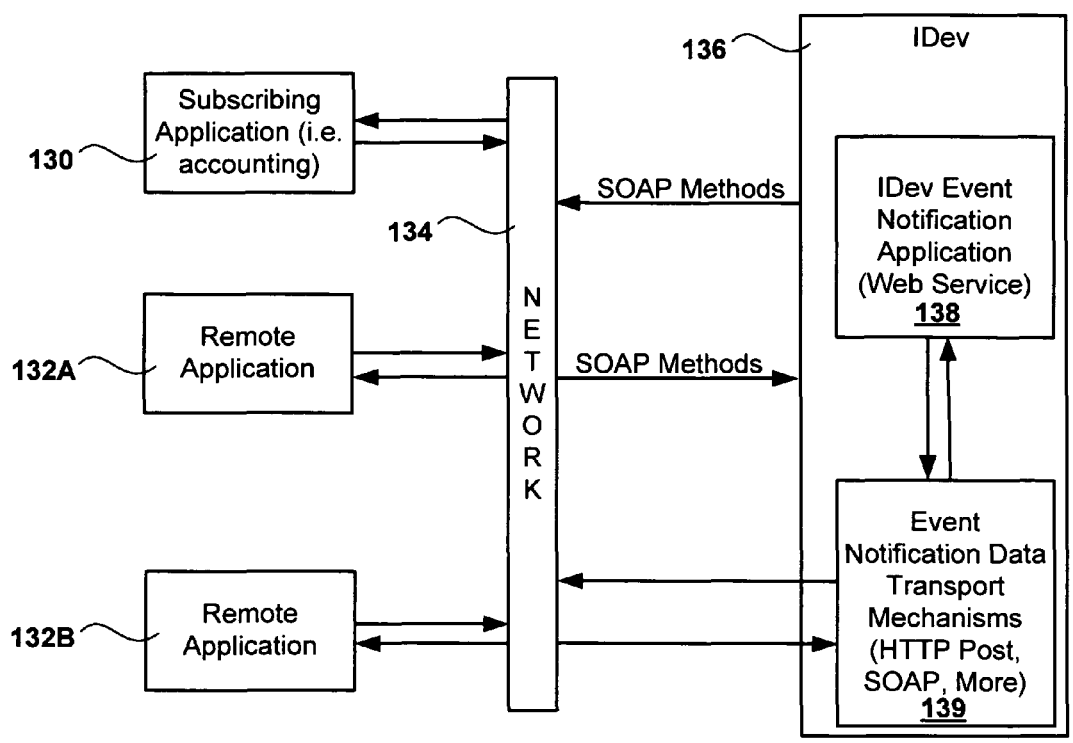
FIG. 13 is a diagram showing a system for imaging device event notification.

Some embodiments of the present invention may be described with reference to FIG. 13. These embodiments may comprise a subscribing application 130, such as an accounting application, which is capable of requesting and receiving a global or job-specific event notification subscription. A subscribing application may be an External Authority Application, which has special privileges and access to restricted notification resources. In some embodiments, the External Authority Application may have access to global notifications that are not job-specific. An External Authority Application may need to submit credentials for authentication before receiving restricted notifications.

Some embodiments may further comprise other remote subscribing applications 132A & 132B which may request event notification subscriptions from an imaging device (IDev) 136 event notification application 138. These applications 132A & 132B may only have access to unrestricted notifications. The external authority application, remote applications and IDev notification application may communicate with each other through means of a network 134 using SOAP methods or other methods. The external authority application and remote applications may also designate an event notification transport mechanism 139 which may be used for sending and receiving event notifications and related data. Typical event notification transport mechanisms comprise HTTP Post, e-mail, SOAP messages and other mechanisms.

Figure 14:
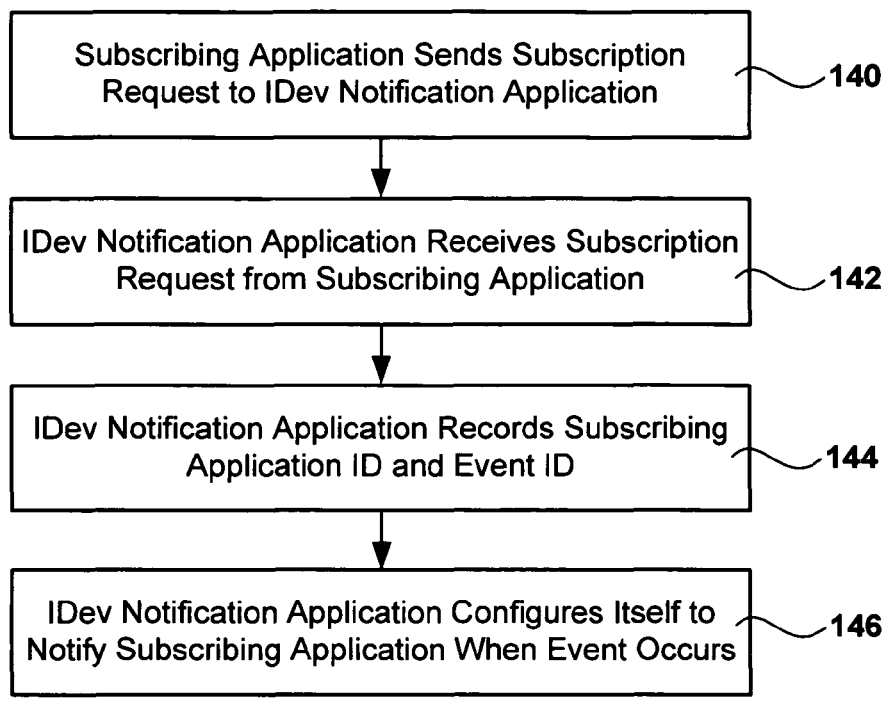
FIG. 14 is a chart showing steps of an embodiment comprising event notification subscription.

Some embodiments of the present invention may be described with reference to FIG. 14. In these embodiments, a subscribing application may send 140 a subscription request to an IDev notification application. A subscription request may comprise a subscribing application address and an event type. In some embodiments, a subscription request may also comprise user or application credentials and other data. The IDev notification application may then receive 142 the subscription request from the subscribing application and record 144 the subscribing application ID and event identification in a subscription record. The IDev notification application may then configure itself 146 to notify the subscribing application identified in the subscription request when the event identified in the subscription request occurs.

Figure 15A:
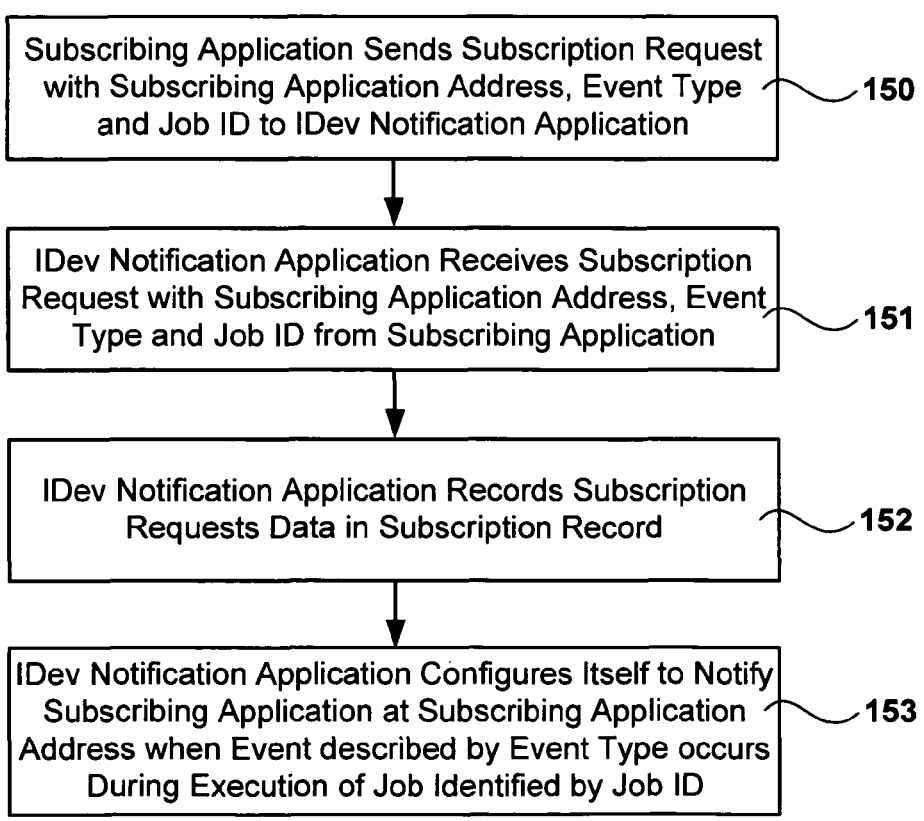
FIG. 15A is a chart showing steps of an embodiment comprising event notification subscription using event types and Job ID.

In further embodiments of the present invention, as illustrated in FIG. 15A, a job-specific subscription may be implemented. In these embodiments, a subscribing application may send 150 a subscription request comprising a subscribing application address, an event type and a job ID to an IDev notification application. The IDev notification application may receive 151 the subscription request comprising the subscribing application address, the event type and the job ID from the subscribing application. The IDev notification application may then record 152 the subscription request data in a subscription record. The IDev notification application may then configure itself 153 to notify the subscribing application at the subscribing application address when the event described by the event type occurs during execution of the job identified by the job ID. A job ID may comprise a job ticket.

Figure 15B:
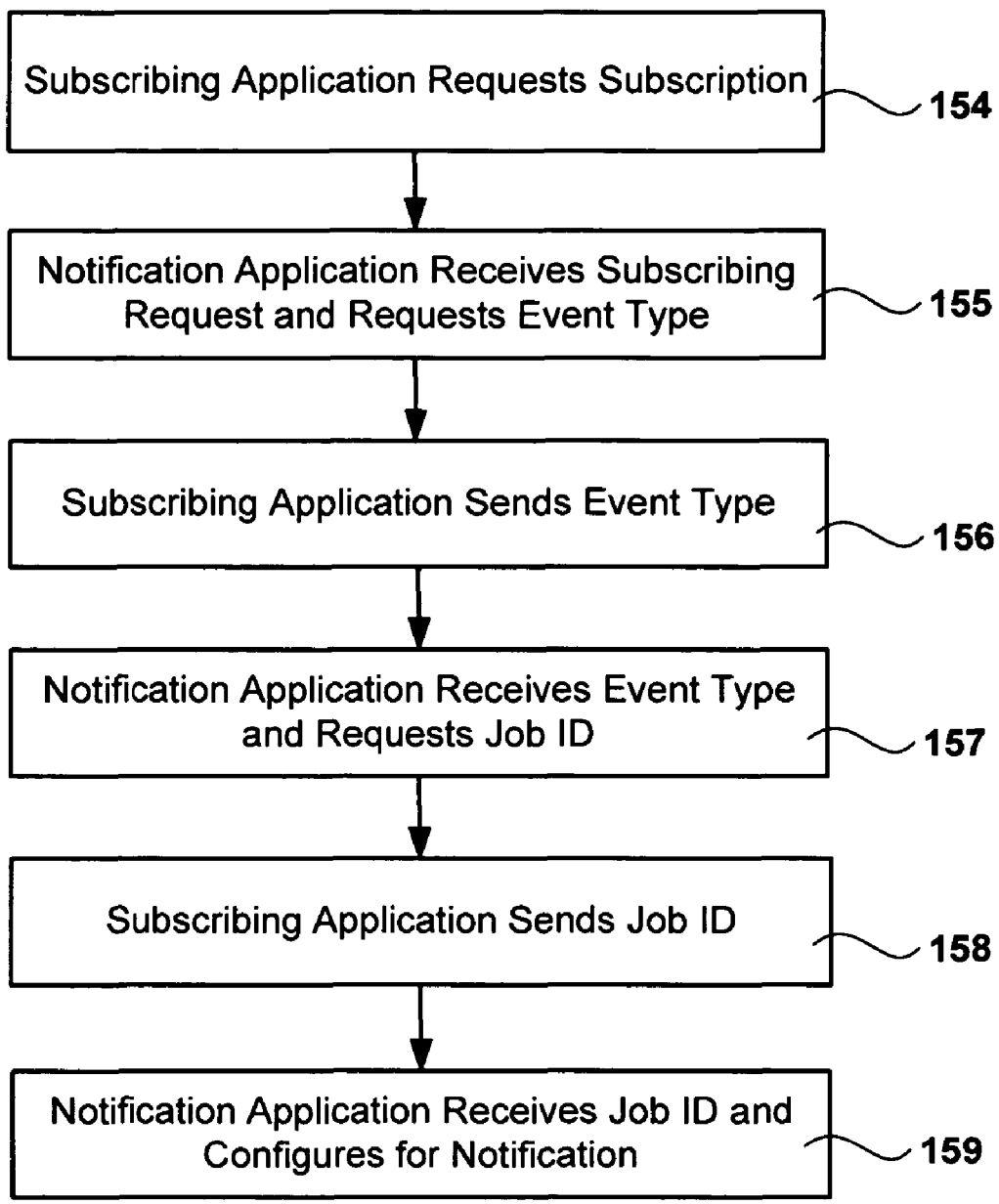
FIG. 15B is a chart showing steps of an alternative embodiment comprising event notification subscription using event types and Job ID.

In further embodiments of the present invention, as illustrated in FIG. 15B, an alternative job-specific subscription may be implemented. In these embodiments, a subscribing application may send 154 a simple subscription request to an IDev notification application. The IDev notification application may receive 155 the simple subscription request and request an event type from the subscribing application. The subscribing application may then send 156 an event type to the notification application. Upon receiving the event type, the notification application may request 157 a job ID from the subscribing application. The subscribing application may then supply 158 a job ID to the notification application. Once the notification application has the subscription request, the event type and the job ID, the notification application may configure 159 to send a notification to the subscribing application when the event identified by the event type occurs during the execution of the job identified by the job ID.

Figure 16:
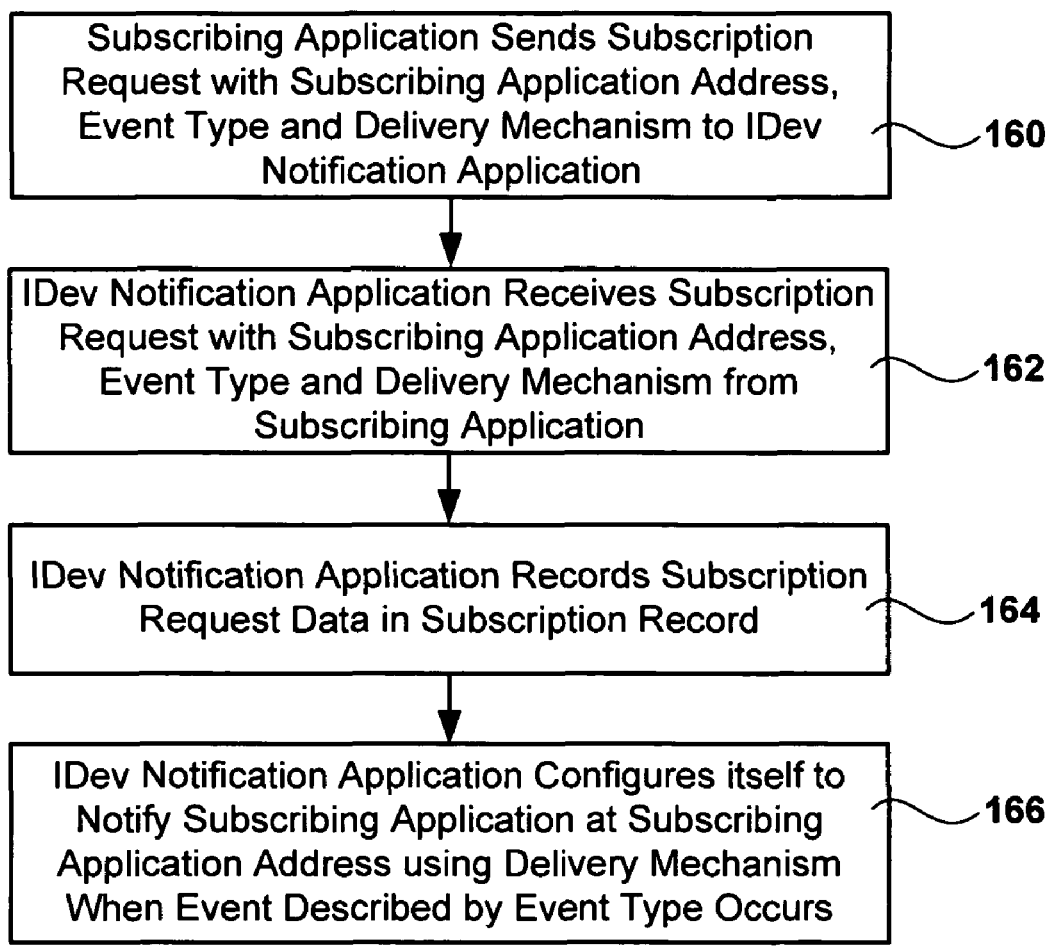
FIG. 16 is a chart showing steps of an embodiment comprising event notification subscription using a delivery mechanism.

Some embodiments of the present invention, illustrated in FIG. 16, comprise an event notification subscription using a specified notification delivery mechanism. In these embodiments, a subscribing application may send 160 a subscription request with a subscribing application address, an event type and a specified delivery mechanism to an IDev notification application. The IDev notification application may receive 162 the subscription request with the subscribing application address, event type and specified delivery mechanism from the subscribing application. The IDev notification application may then record 164 the subscription request data, comprising the specified delivery mechanism, in a subscription record. The IDev notification application may then configure itself 166 to notify the subscribing application at the subscribing application address using the specified delivery mechanism when an event described by the event type occurs. In similar embodiments, the subscription request, subscribing application address and specified delivery mechanism may be exchanged through multiple messages.

Figure 17:
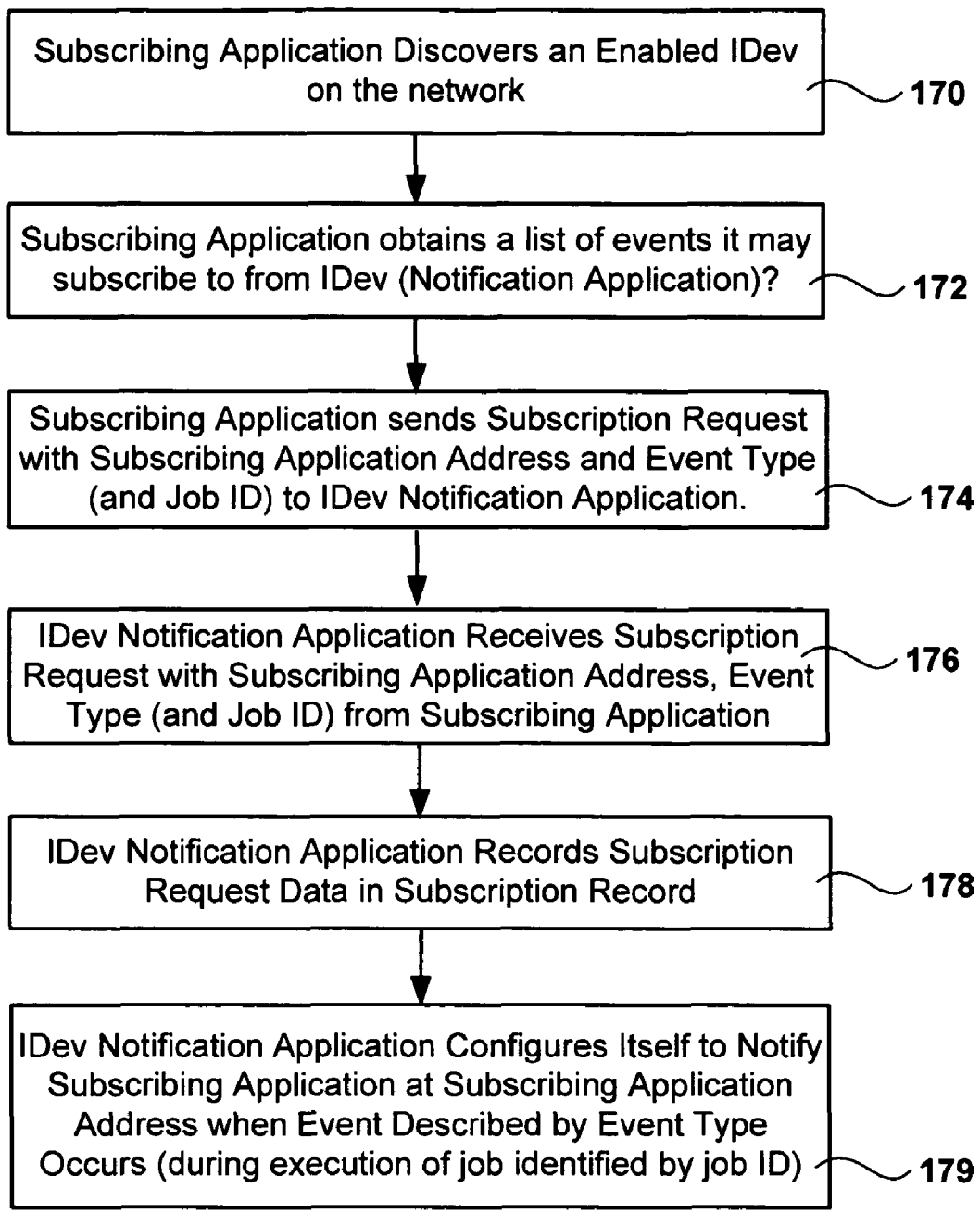
FIG. 17 is a chart showing steps of an embodiment comprising event notification subscription using event types, job ID and a delivery mechanism.

Other embodiments of the present invention may be described with reference to FIG. 17. In these embodiments, a subscribing application, such as an accounting application, may discover 170 an enabled IDev on the network. The subscribing application may then obtain 172, from the IDev, a list of reportable events that the IDev is capable of identifying for notification purposes. In some embodiments, a subscribing application may detect these reportable events by means other than a list supplied by the IDev, such as by identifying an IDev and searching an external source for specific IDev data. Reportable events may also be determined through detection of IDev capabilities directly through various protocols.

Once reportable events have been identified, a subscribing application may send 174 a subscription request to the IDev notification application. This subscription request or a related message may comprise a subscribing application address to which notifications may be sent. The subscription request or a related message may also comprise one or more event types selected from the reportable events obtained from the IDev. A subscription request or a related message may also identify a job ID to an IDev notification application. The IDev notification application may receive 176 the subscription request and any related messages comprising a subscribing application address, an event type and any job ID (for job-specific notification embodiments) from the subscribing application. The IDev notification application may then record 178 the subscription request and any related data in a subscription record. The IDev notification application may then configure itself 179 to notify the subscribing application at the subscribing application address when the event described by the event type occurs. In some job-specific notification embodiments, this notification would only occur when the event occurs during execution of the job identified by the job ID.

Some embodiments of the present invention comprise a notification subscription with access control. In these embodiments, a subscribing application may be required to submit credentials before being granted a subscription. In some embodiments, only certain subscriptions require credentials while others do not.

Figure 18:
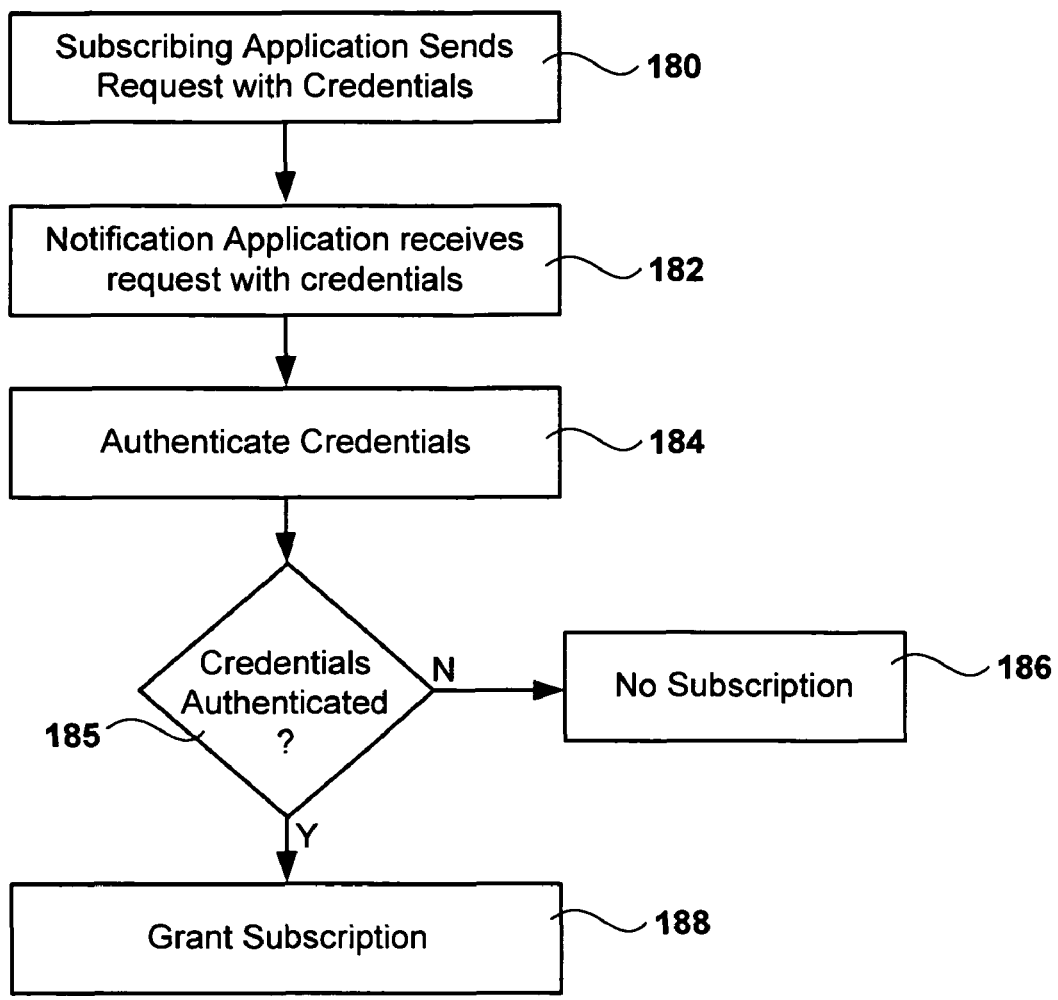
FIG. 18 is a chart showing steps of an embodiment comprising event notification access control.

Some embodiments of the present invention may be described with reference to FIG. 18. In these embodiments, a subscribing application may send 180 a subscription request comprising credentials to an IDev notification application. The IDev notification application may then receive 182 the subscription request comprising the credentials. Once the credentials have been received, the notification application may authenticate 184 the credentials. The notification application may then decide 185 whether to deny 186 the subscription request or grant 188 the subscription. When the credentials authenticate successfully and the user/account is authorized to receive the requested notification, the subscription request may be granted 188.

Figure 19:
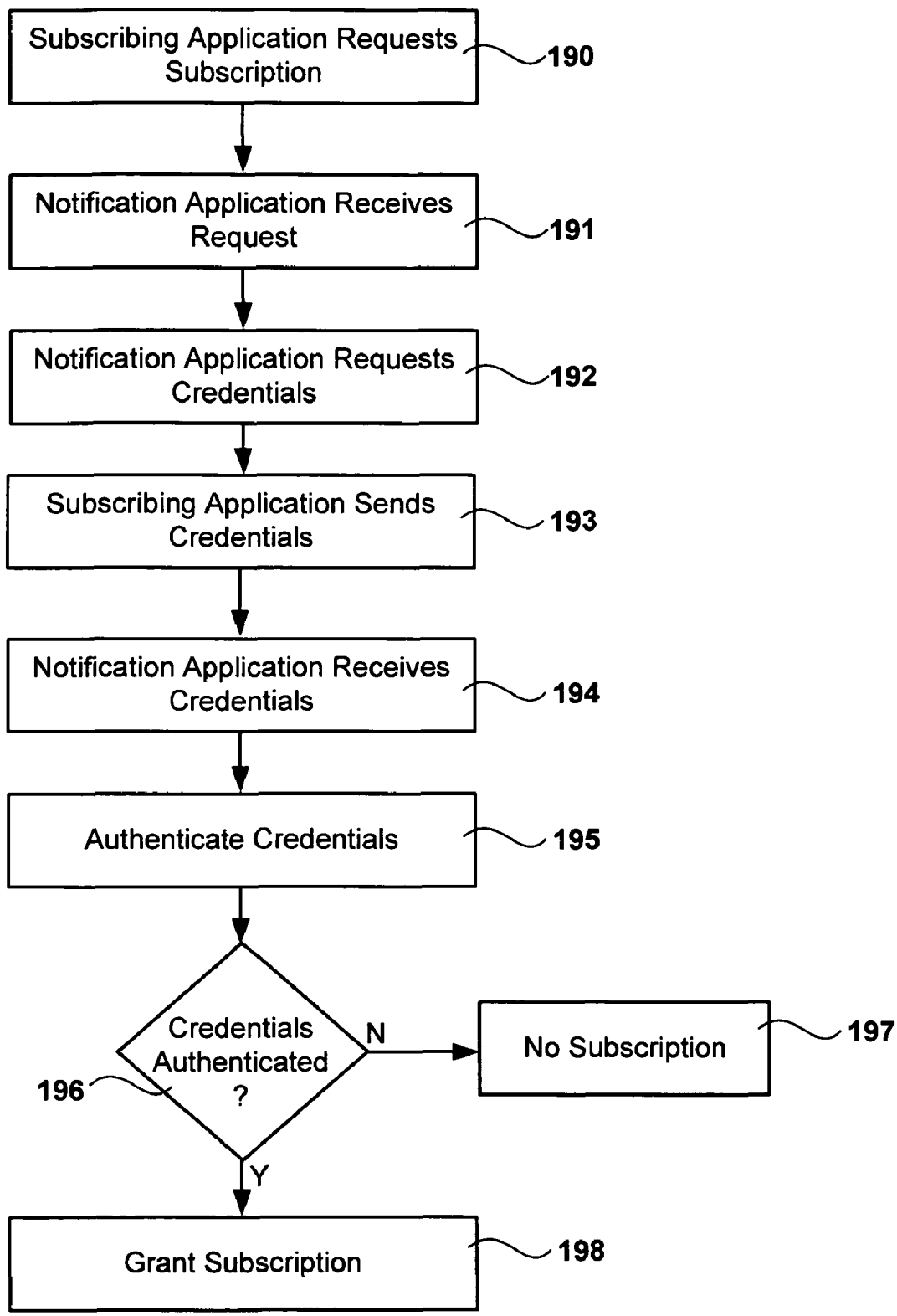
FIG. 19 is a chart showing steps of an embodiment comprising event notification access control using a request for credentials.

Further embodiments of the present invention may be described with reference to FIG. 19. In these embodiments, a subscribing application may request 190 a notification subscription from a notification application. The notification application may then receive 191 the request and may, when the notification requested is restricted, request 192 credentials from the subscribing application, if none were supplied in the subscription request. The subscribing application may then send 193 the credentials to the notification application which may then receive 194 the credentials. The notification application may then authenticate 195 the credentials and verify that the authenticated user/account is authorized to receive the requested notification. Based on this verification, the notification application may then decide 196 whether to deny 197 the subscription or grant 198 the subscription.

Figure 20:
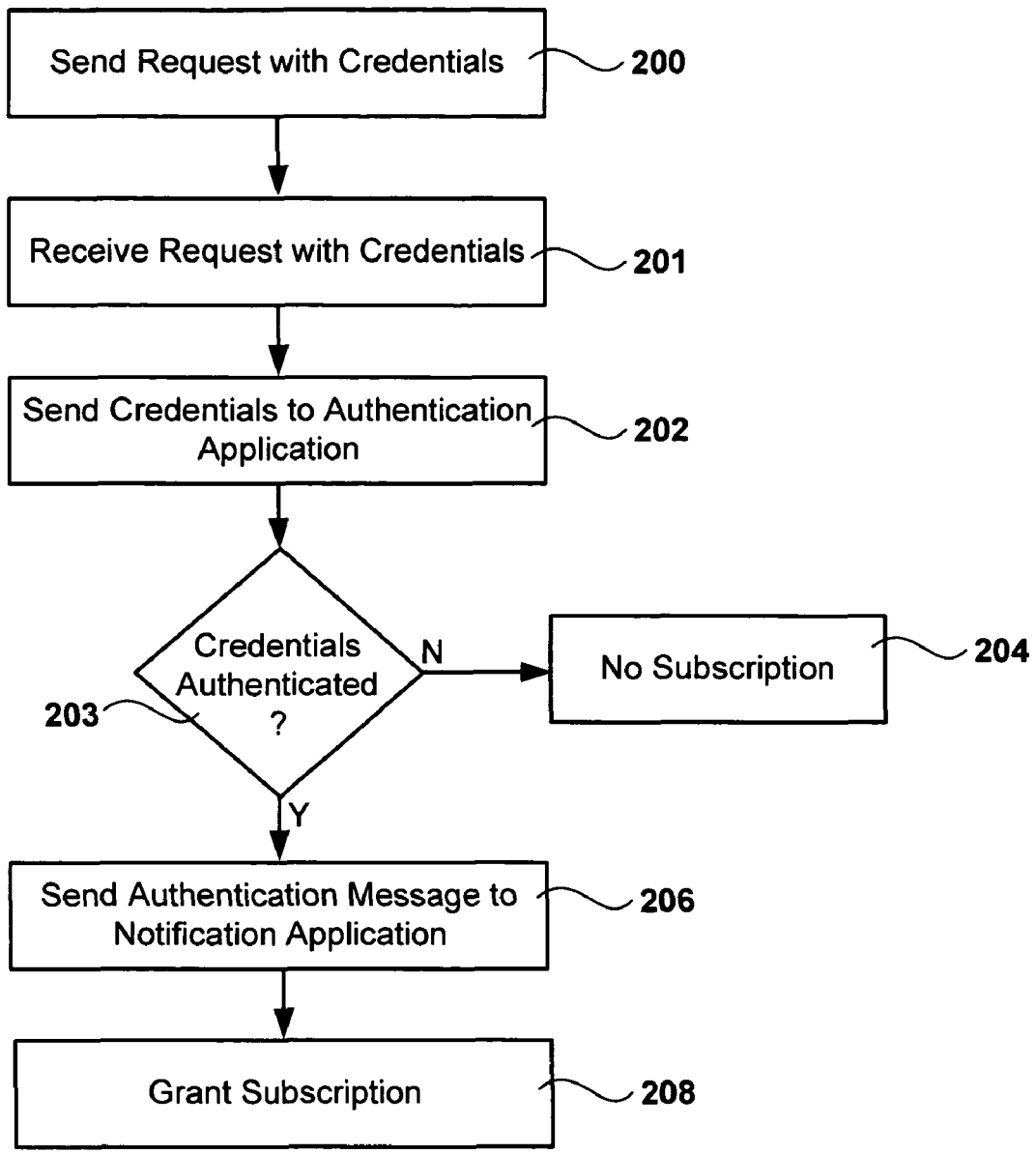
FIG. 20 is a chart showing steps of an embodiment comprising event notification access control using an authentication application.

Other embodiments of the present invention may be described with reference to FIG. 20. In these embodiments, a subscribing application may send 200 a subscription request containing a credential to an IDev notification application. The IDev notification application may then receive 201 the subscription request containing the credential and send 202 the credential to an authentication application which may then authenticate 203 the credential. The authentication application may then notify the notification application of the results of the authentication process. The notification application may then deny the subscription 204, when authentication is unsuccessful. When authentication is successful, the authentication application may send 206 an authentication message to the notification application, which may then grant 208 the subscription request.

Figure 21:
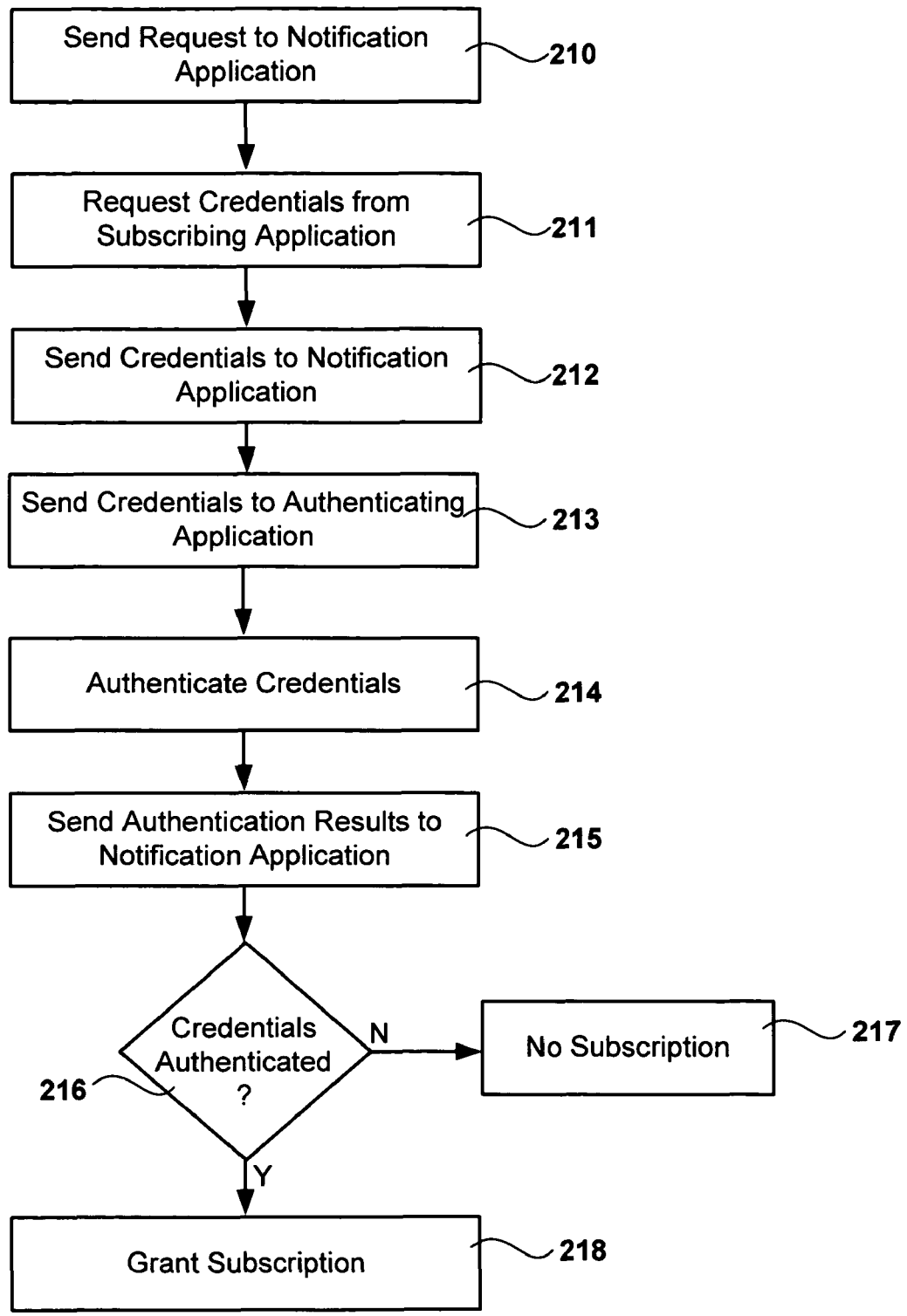
FIG. 21 is a chart showing steps of an embodiment comprising event notification access control using a request for credentials and an authentication application.

Other embodiments of the present invention may be described with reference to FIG. 21. In these embodiments, a subscribing application may send 210 a subscription request to an IDev notification application. The IDev notification application may then request 211 credentials from the subscribing application, which may then send 212 the credentials to the notification application. The notification application may then send 213 the credentials to an authentication application which may authenticate 214 the credentials. The authentication application may then inform 215 the notification application of the results of the authentication. Based on these results, the notification application may deny the subscription 218 or grant 217 the subscription.

Figure 22:
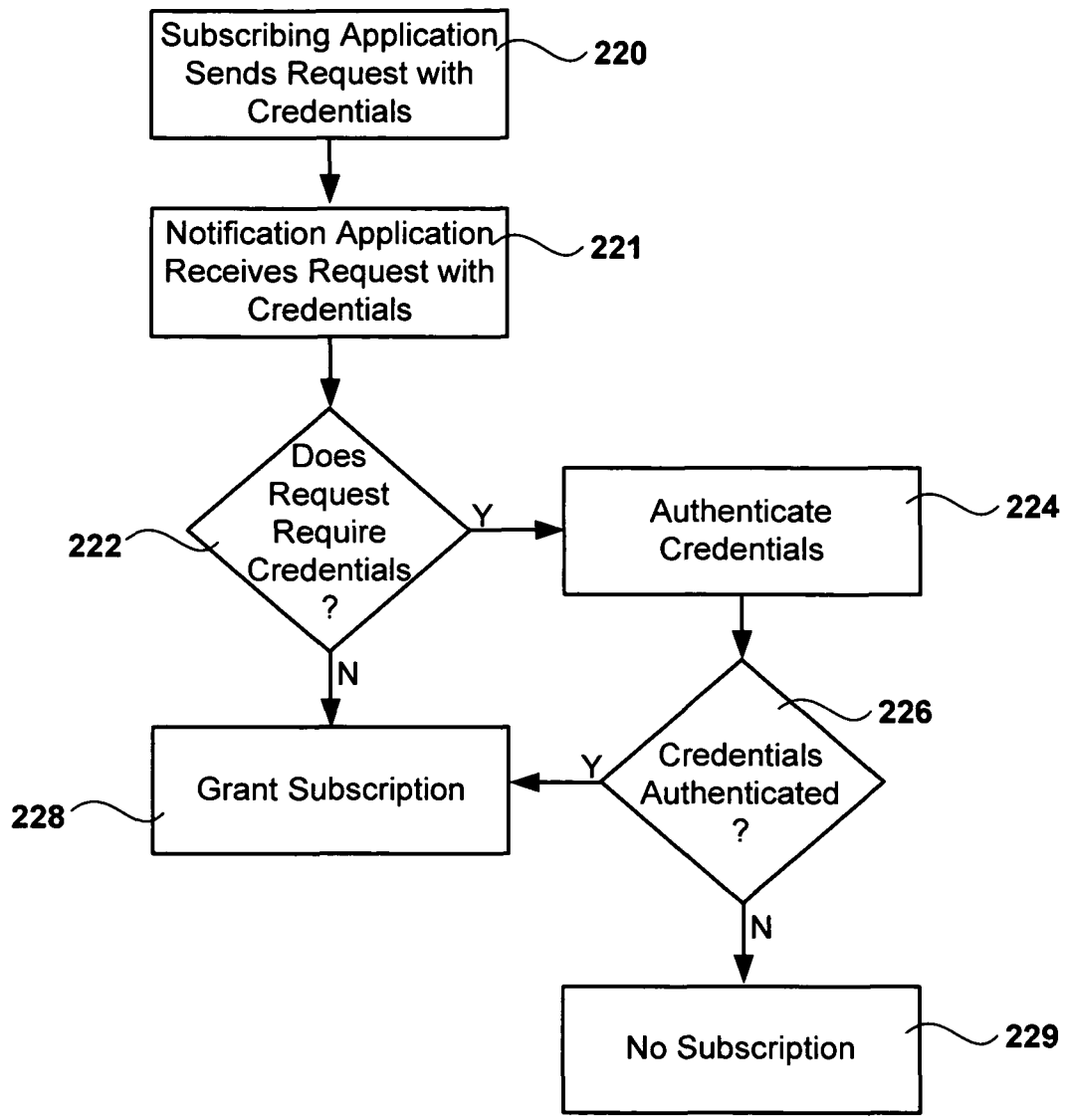
FIG. 22 is a chart showing steps of an embodiment comprising event notification access control when requested notification requires credentials.

Further embodiments of the present invention may be described with reference to FIG. 22. In these embodiments, a subscribing application may send 220 a subscription request comprising credentials to an IDev notification application. The IDev notification application may then receive 221 the subscription request and the credentials and may determine 222 whether the subscription request is of a type that requires authenticated credentials. In some exemplary embodiments these types of subscription requests may comprise a request for a global subscription from an external authority application such as an accounting application or a subscription request for a protected job. If the subscription request is restricted and does require authenticated credentials, the notification application may then authenticate 224 the credentials. The notification application may then deny the subscription request 229 if the authentication is unsuccessful or if the authenticated user/account is not authorized to receive the requested notification. If authentication is successful and the user/account is authorized to receive the requested notification, the subscription request may be granted 228. If the subscription request is not restricted and does not require credentials 222, the subscription request may be granted 228 without processing the credentials.

Figure 23:
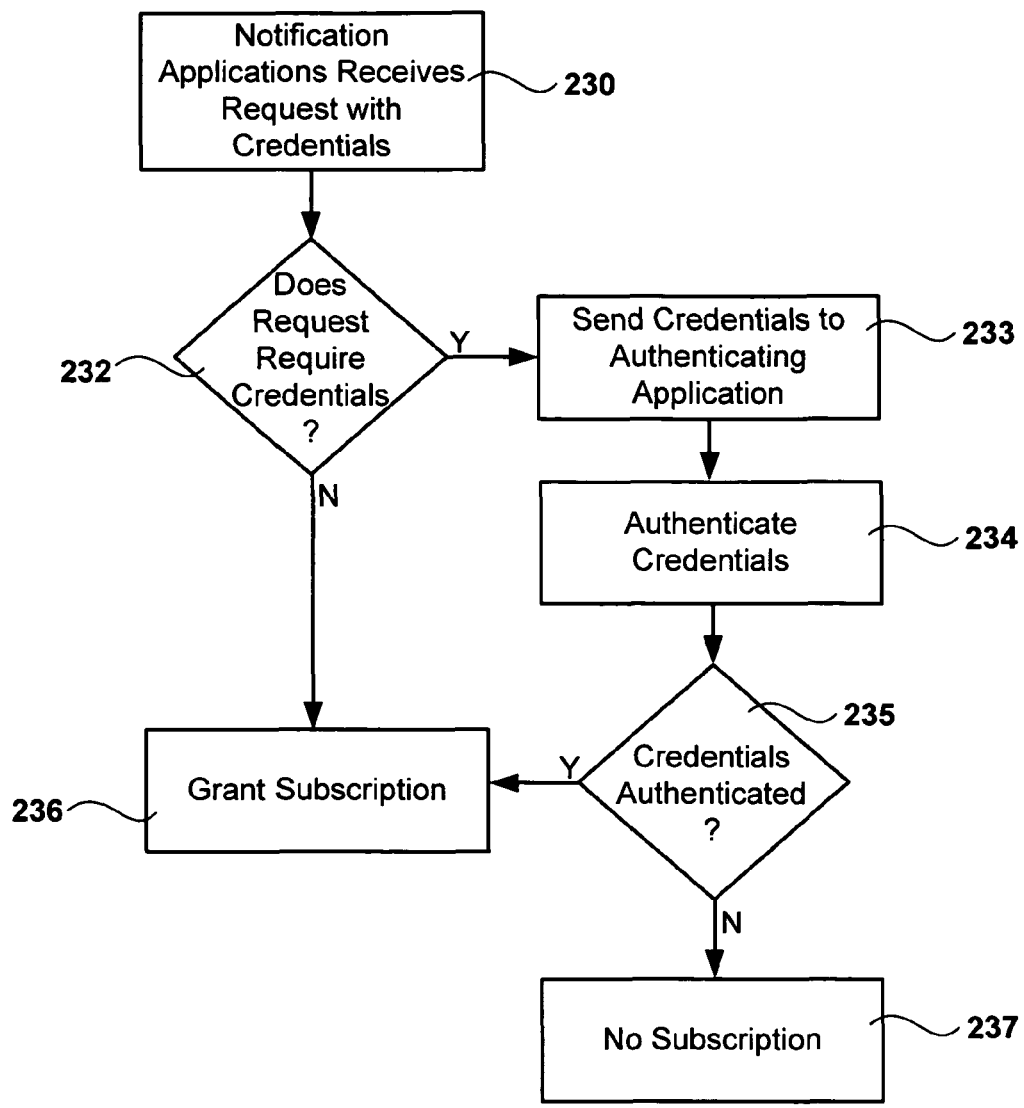
FIG. 23 is a chart showing steps of an embodiment comprising event notification access control using an authentication application when notification requires credentials.

Other embodiments of the present invention may be described with reference to FIG. 23. In these embodiments, a subscribing application may send 230 a subscription request comprising credentials to an IDev notification application. The IDev notification application may then determine 232 whether the subscription request is of a type that requires authenticated credentials. If the subscription request does require authenticated credentials the notification application may then send 233 the credentials to an authentication application which may authenticate 234 the credentials. The notification application may then analyze the results of the authentication process and deny the subscription request 237 if the authentication is unsuccessful or if the authenticated user/account is not authorized to receive the requested notification. The notification application may also grant 236 the subscription request if the authentication is successful and the authenticated user/account is authorized to receive the requested notification. If the subscription request is not restricted and does not require credentials 232, the subscription request may be granted 236 without processing the credentials.

Figure 24:
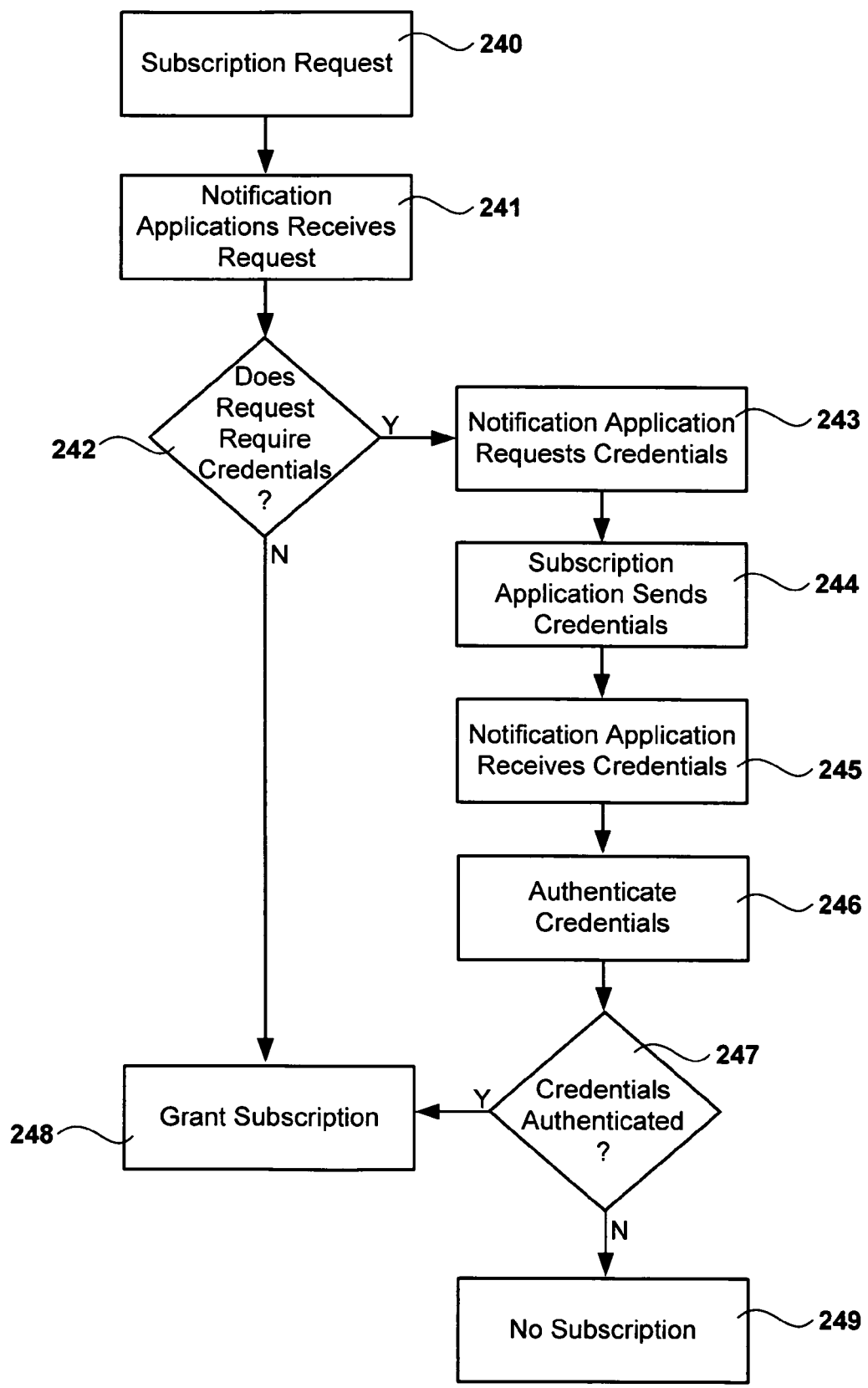
FIG. 24 is a chart showing steps of an embodiment comprising event notification access control using a credential request when required.

Further embodiments of the present invention may be described with reference to FIG. 24. In these embodiments, a subscribing application may send 240 a subscription request to an IDev notification application. The IDev notification application may then receive 241 the subscription request and may then determine 242 whether the subscription request is of a type that requires authenticated credentials. If the subscription request does require authenticated credentials, the notification application may then request 243 the credentials from the subscribing application. The subscribing application may then send 244 the credentials to the notification application which may then receive 245 the credentials. The notification application may then authenticate 246 the credentials. The notification application may then analyze the results of the authentication process and deny the subscription request 249 if the authentication is unsuccessful or if the authenticated user/account is not authorized to receive the requested notification. The notification application may also grant 248 the subscription request if the authentication is successful and the authenticated user/account is authorized to receive the requested notification. If the subscription request is not restricted and does not require credentials 242, the subscription request may be granted 248 without processing the credentials.

Figure 25:
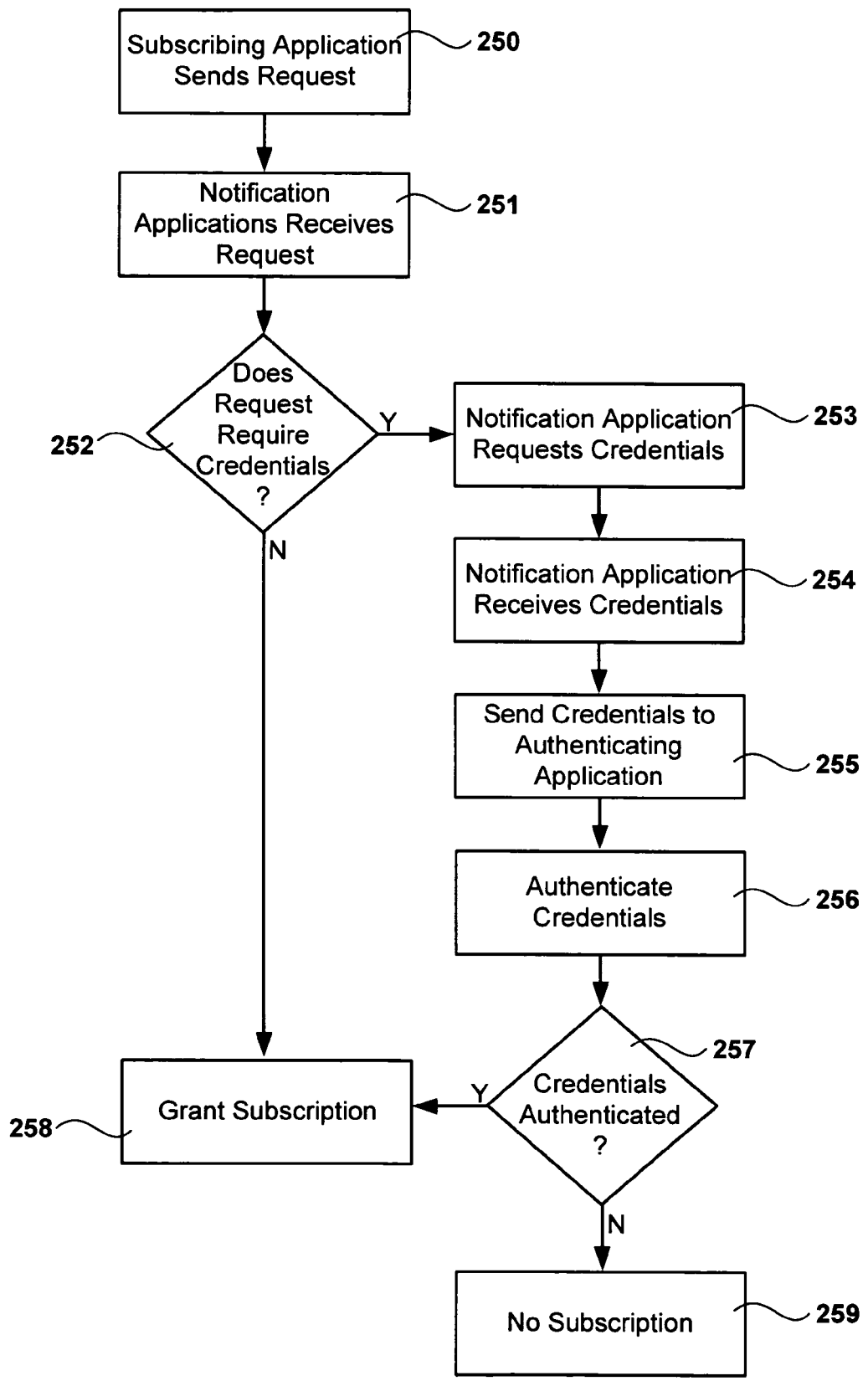
FIG. 25 is a chart showing steps of an embodiment comprising event notification access control using an authentication application and credential request.

Other embodiments of the present invention may be described with reference to FIG. 25. In these embodiments, a subscribing application may send 250 a subscription request to an IDev notification application. The IDev notification application may then receive 251 the subscription request and determine 252 whether the subscription request is of a type that requires authenticated credentials. If the subscription request does require authenticated credentials the notification application may then request 253 the credentials from the subscribing application. After receiving 254 the credentials from the subscribing application the notification application may then send 255 the credentials to an authentication application. The authentication application may then authenticate 256 the credentials and send the results to the notification application. The notification application may then analyze the results of the authentication process and deny the subscription request 259 if the authentication is unsuccessful or if the authenticated user/account is not authorized to receive the requested notification. The notification application may also grant 258 the subscription request if the authentication is successful and the authenticated user/account is authorized to receive the requested notification. If the subscription request is not restricted and does not require credentials 252, the subscription request may be granted 258 without processing the credentials.

Further embodiments of the present invention comprise systems and methods for event notification. Some of these embodiments comprise global and job-specific notification. Some embodiments also comprise notification by a specified delivery mechanism.

Figure 26:
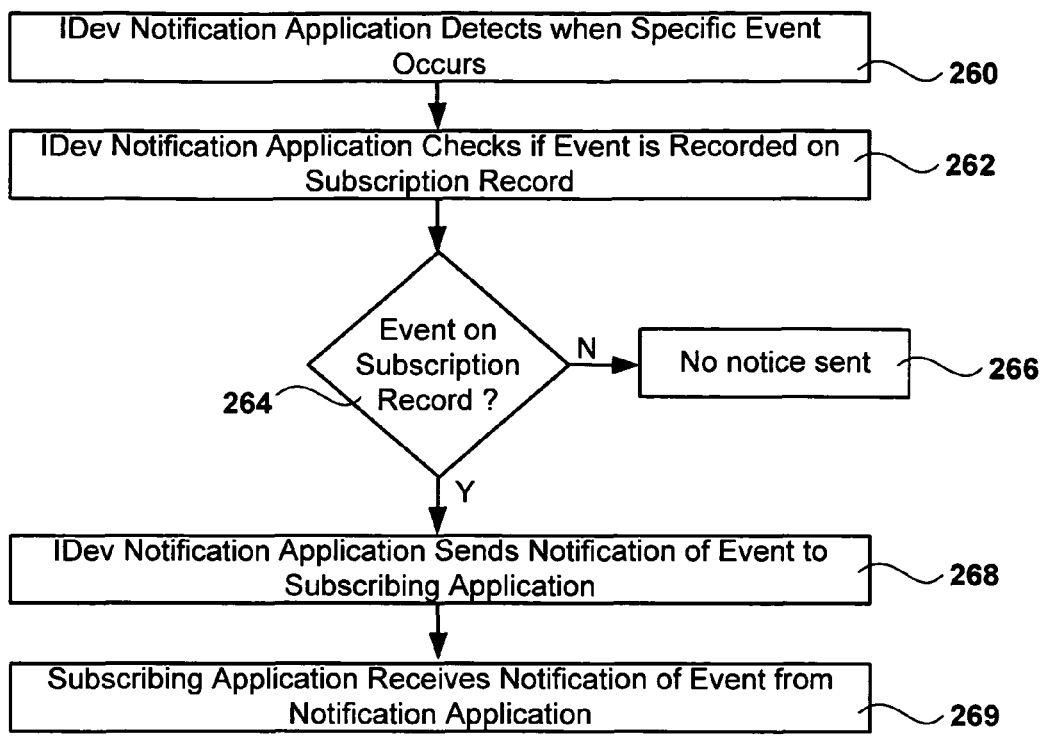
FIG. 26 is a chart showing steps of an embodiment comprising event notification.

Some embodiments of the present invention may be described with reference to FIG. 26. In these embodiments, an IDev notification application may detect 260 when a specific event occurs. The IDev notification application may then check 262 to determine if the event is recorded on a subscription record. The IDev notification application may then chose not to send a notification 266 if the specific event is not on the subscription record. Alternatively, the notification application may send 268 a notification of the specific event to any subscribing application when the event is found on the subscription record. The subscribing application may then receive 269 the notification of the event from the notification application.

Figure 27:
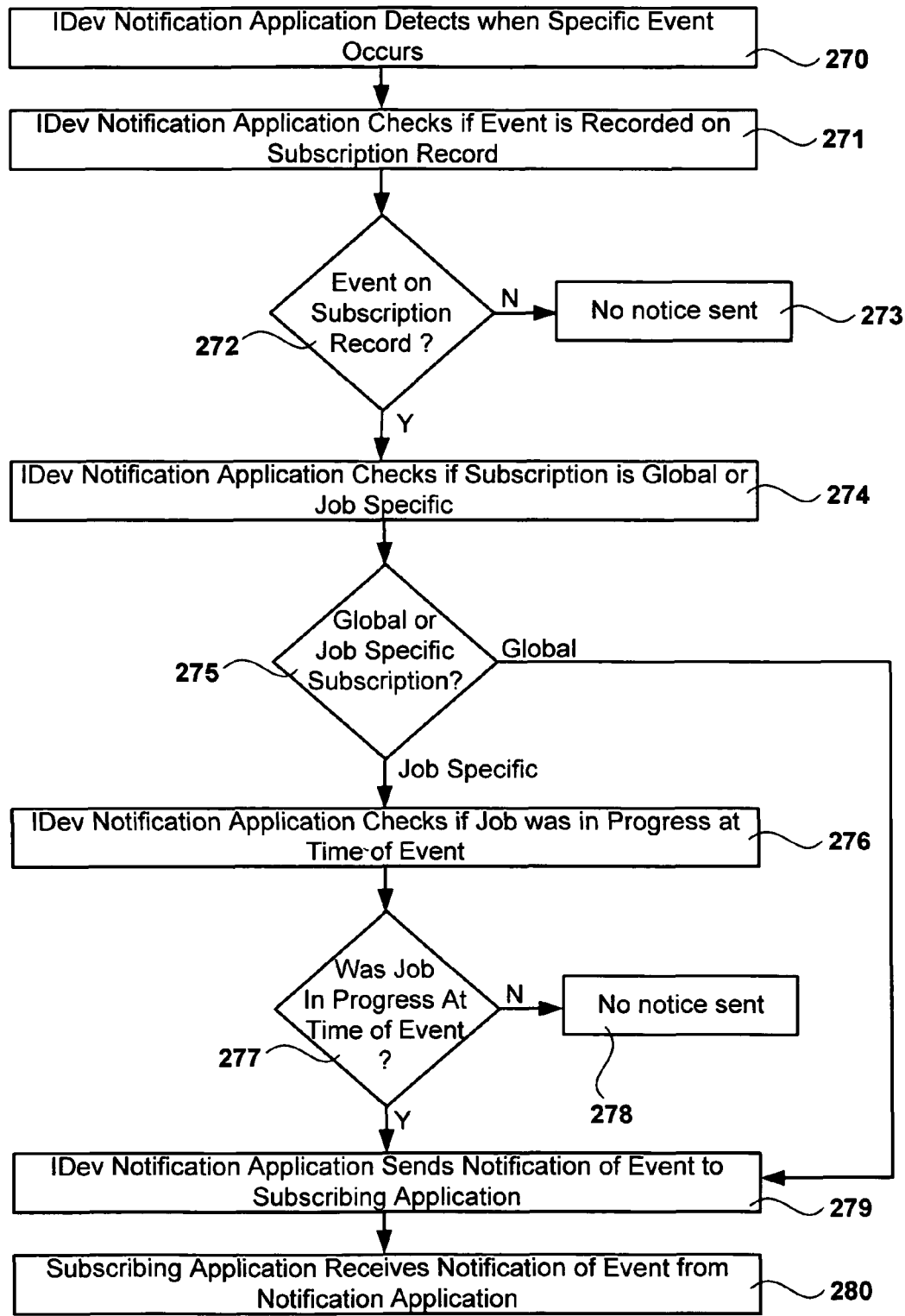
FIG. 27 is a chart showing steps of an embodiment comprising event notification with global subscriptions.

Other embodiments of the present invention may be described with reference to FIG. 27. In these embodiments, an IDev notification application may detect 270 when a specific event occurs. The IDev notification application may then check 271 to determine if the event is recorded on a subscription record. The IDev notification application may then choose not to send a notification 273 if the specific event is not on the subscription record. Alternatively, if the specific event is on the subscription record, the notification application may then check 274 if the subscription is for a global subscription or a job specific subscription. If the subscription is a global subscription, the notification application may send 279 a notification of the event to the subscribing application.

If the subscription is job-specific, the notification application may check 276 to determine if the job was in progress at the time of the event. If the job was not in progress at the time of the event the notification application may choose not to send 278 a notification of the event as the job-specific subscription is not active. If the job was in progress at the time of the event, the notification application may send 279 a notification of the event to the subscribing application. The subscribing application may then receive 280 the notification of the event from the notification application. A notification application may determine whether a job is in progress using a job ticket method, wherein job tickets are maintained by an application during the execution of a job. Once a job has been completed, the job ticket may be deleted.

Figure 28:
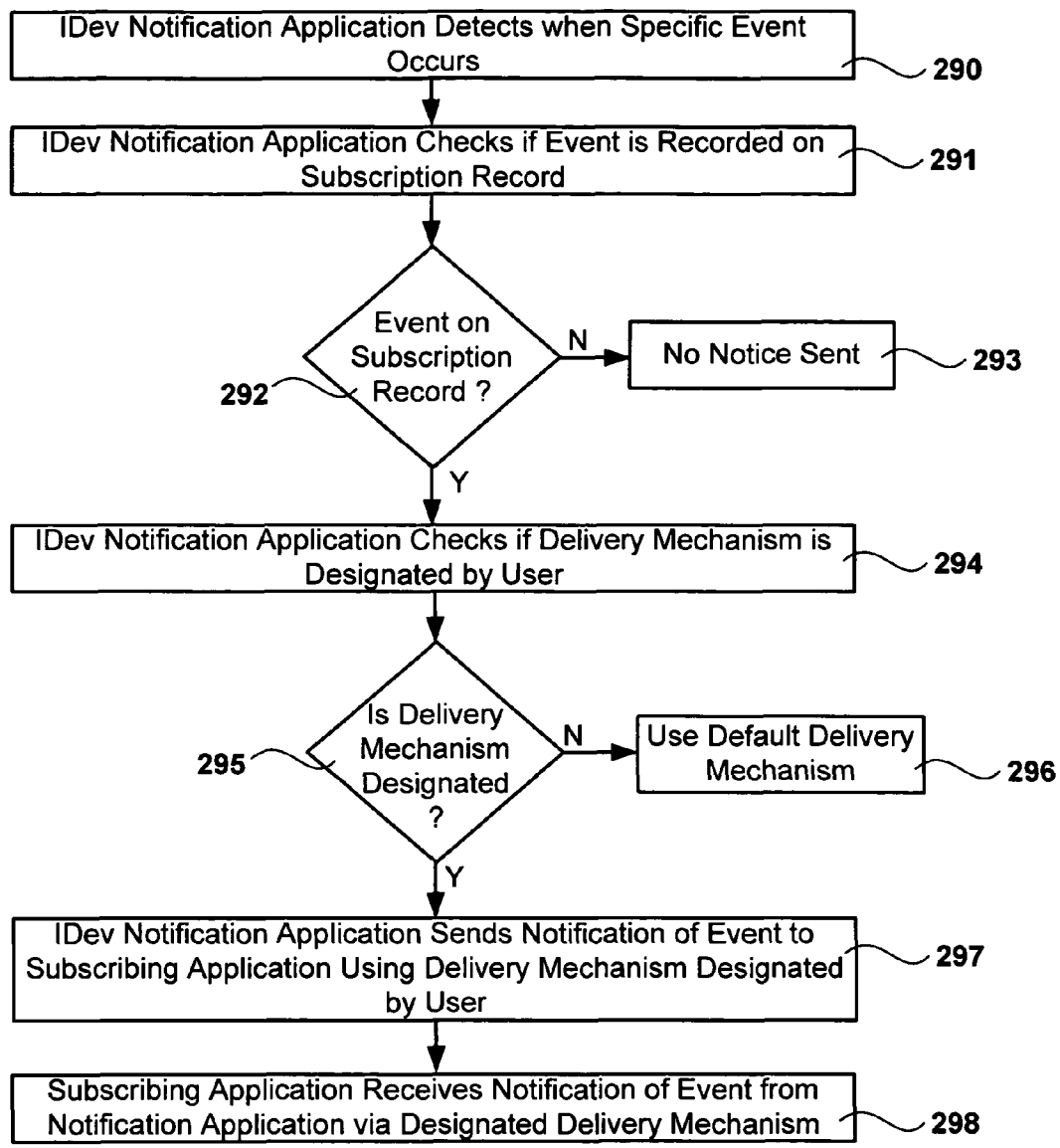
FIG. 28 is a chart showing steps of an embodiment comprising event notification using a delivery mechanism.

Further embodiments of the present invention may be described with reference to FIG. 28. In these embodiments, an IDev notification application may detect 290 when a specific event occurs. The IDev notification application may then check 291 to determine if the event is recorded on a subscription record. The IDev notification application may then choose not to send a notification 293 if the specific event is not on the subscription record. If the specific event is on the subscription record, the notification application may then check 294 if the delivery mechanism for the notification has been designated by the user. If the delivery mechanism for the notification has been designated by the user, the notification application may send 297 notification of the event to the subscribing application using the designated delivery mechanism. If the delivery mechanism for the notification is not designated by the user, the notification application may send notification of the event using a default delivery mechanism 296. The subscribing application may then receive 298 the notification of the event from the notification application via the default or designated delivery mechanism when a notification message is sent.

Figure 29A:
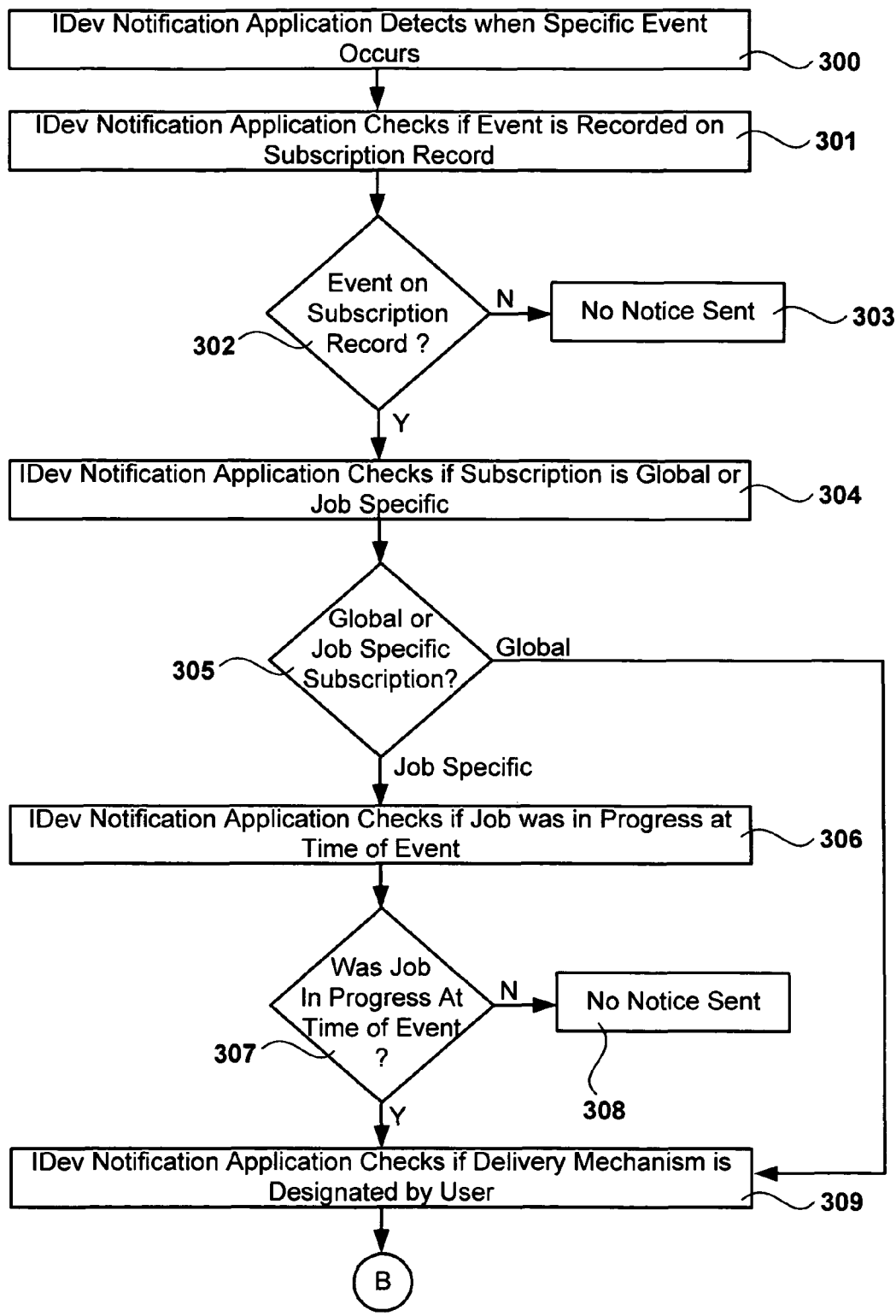
FIG. 29 is a chart showing steps of an embodiment comprising event notification using a global subscription and a delivery mechanism.
Figure 29B:
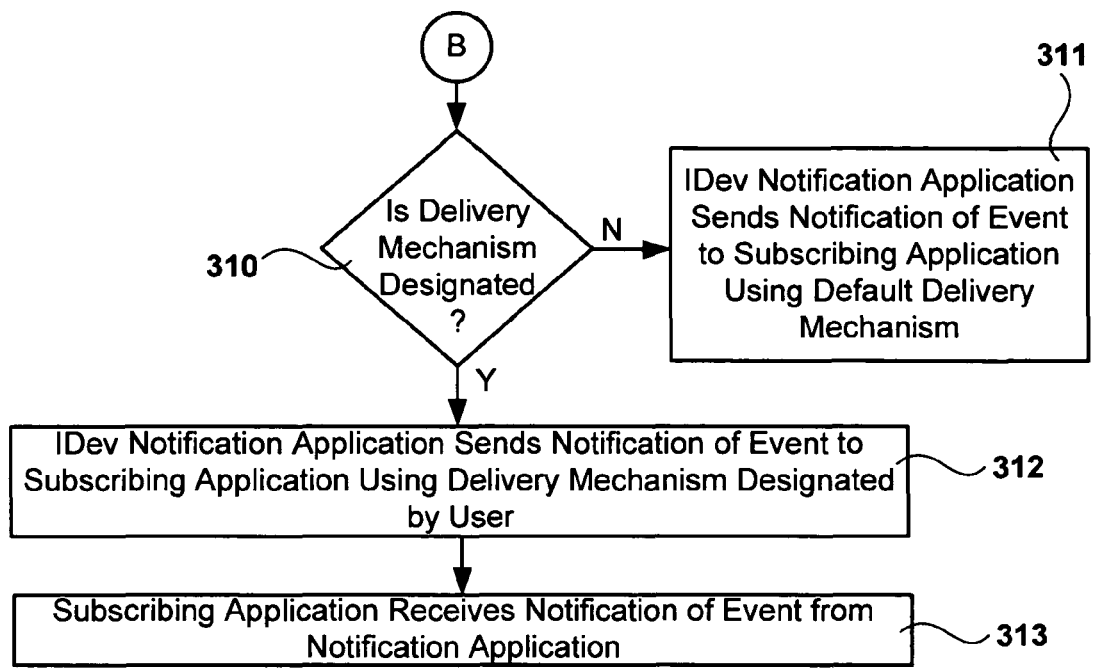

Further embodiments of the present invention may be described with reference to FIG. 29. In these embodiments, an IDev notification application may detect 300 when a specific event occurs. The IDev notification application may then check 301 to determine if the event is recorded on a subscription record. The IDev notification application may then choose not to send a notification 303 if the specific event is not on the subscription record. If the specific event is on the subscription record, the notification application may check 304 whether the subscription is global or job-specific.

If the subscription is global, the notification application may then check 309 if the delivery mechanism for the notification has been designated. If the subscription is job-specific, the notification application may check whether the job was in progress 307 at the time of the event. If the job was not in progress when the event occurred, the notification application may chose not to send a notice 308. If the job was in progress at the time of the event, the notification application may check 309 if the delivery mechanism for the notification has been designated. If the delivery mechanism for the notification has been designated, the notification application may send 312 notification of the event to the subscribing application using the designated delivery mechanism. If the delivery mechanism has not been designated, the notification application may send notification of the event using a default delivery mechanism 311. The subscribing application may then receive 313 the notification of the event from the notification application via the designated delivery mechanism or the default delivery mechanism when a notification is sent.

Core Web Service Framework

Figure 30:
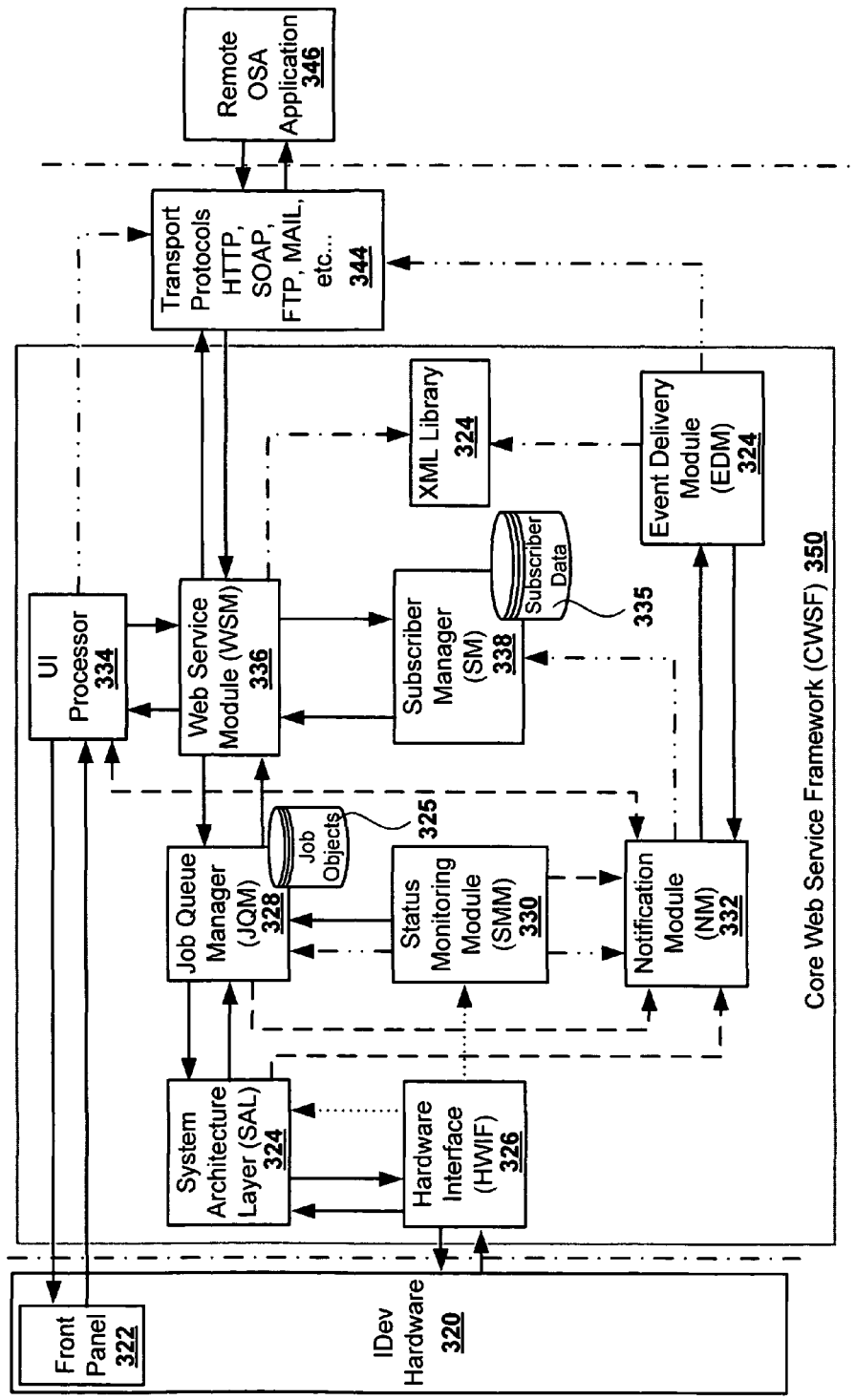
FIG. 30 is a diagram showing elements of an embodiment comprising a Core Web Service Framework.

Some embodiments of the present invention may be described with reference to FIG. 30. The embodiments comprise a core web service framework (CWSF) 350. CWSF 350 may comprise a platform for building, deploying and running a web service on an IDev, such as an MFP. Some may provide a standards-based, multi-language execution environment for building distributed network applications. These applications may control processes executing on the IDev.

In some embodiments, a CWSF 350 may comprise a hardware interface (HWIF) 326 connecting to IDev hardware 320. An HWIF 326 may shield the CWSF 350 from particular platform hardware specific details. A standardized HWIF 326 may allow the CWSF 350 to communicate with multiple IDev hardware devices 320 meeting the interface standard.

An HWIF module 326 may provide hardware abstraction of an IDev that hosts a CWSF 350. An HWIF module 326 may comprise a set of device—independent APIs that the CWSF 350 uses to communicate with actual IDev hardware 320 components. On the other side, an HWIF module 326 may implement device specific operation that it uses to control the hardware components of a particular platform. In this way, the HWIF 326 may shield the CWSF 350 from actual hardware architecture details.

An HWIF module 326 may also serve as a source of notifications that the CWSF 350 receives through a through a status monitoring module (SMM) 330. These notifications may be passed to the CWSF 350 via the SMM 330 by means of callback calls. For example, and not by way of limitation, an HWIF module 326 may act as a source of a Started Notification Callback, which is posted when a device is about to start executing a job. An HWIF 326 may also be the source of a Completed Notification Callback, which may be posted when a job is completed. An HWIF 326 may also be the source of a State Change Notification Callback, which may be posted when a job changes its state. An HWIF 326 may also be the source of a Page Notification Callback, which may be posted when a page is read in or printed.

In some embodiments, a CWSF 350 may comprise a System Architecture Layer (SAL) 324 that is responsible for translating high-level application requests into a sequence of requests specific to a job type at the HWIF 326 level, thereby hiding the complexity from the application. The SAL 324 may group together a sequence of atomic operations into high-level functions. A SAL 324 may provide a logical connection to an HWIF module 326. A SAL 324 may also register a set of notification callbacks with the HWIF module 326. When certain conditions occur while a job executes, the SAL 324 may receive corresponding notification from an HWIF module 326. A SAL 324 may also be the source of event notifications. In some embodiments, a SAL 324 may perform an On_Job_Started notification and/or an On_Job_Completed notification.

The architecture of some embodiments of the present invention may be based on the concept of a job. Depending on the actual device capabilities and device architecture, more than one job may be in progress on an IDev at the same time. For example, and not by way of limitation, a user may execute a scan job while another client is submitting a print job. At the same time, another user may be receiving a fax message and an administrator may be performing an administrative job on the device. In embodiments of the present invention, all these jobs may execute at the same time because each job is identified by a unique identity that is represented by a job object.

The mechanism within the CWSF 350 that controls this dynamic job environment may be referred to as a job queue manager (JQM) 328. A JQM 328 may manage jobs processed by the system. These jobs may be represented by job objects related to user processes executing on a device. Each job may be represented by a job identifier (job ID) and be associated with job settings, job results and an access control list (ACL). The ACL may comprise detailed information about access to job information by notification subscribers. A JQM 328 may manage each job object for its entire lifetime. A JQM 328 may perform functions such as job object creation, job object destruction, managing job settings, keeping track of security data associated with a job's user, keeping track of job state and status and other functions.

A JQM 328 may also be the source of an event notification. In some embodiments, a JQM 328 may be the source of an On_Job_Create notification, and On_Job_Execute notification, an On_Job_Close notification, an On_Job_Cancel notification and other notifications.

A JQM 328 may maintain a job object database 325 of jobs currently being executed on an IDev or associated hardware or applications. The job object database 325 may also comprise an execution journal that persists across device power cycles even when other job information may be lost.

In some embodiments, a CWSF 350 may also comprise a status monitoring module (SMM) 330. The SSM may monitor the status of a device or a job executing on a device. An SMM 330 may monitor changes in device and job states. An SMM 330 may also register a set of notification callbacks with a HWIF module 326. An SMM 330 may inform the JQM 328 or an NM 332 about job or device state changes or other notifications. An SMM 330 may be the source of an On_System_Error notification.

In some embodiments, a CWSF 350 may comprise a notification module (NM) 332. An NM 332 may receive event notifications from many different sources within the CWSF 350. An NM 332 may receive signals indicating internal IDev events or receive other notifications of events occurring on IDev hardware 320, on CWSF 350 modules, on remote applications 346 or other events. When a notification is received, an NM may communicate with a JQM 328 to create an event data message. An NM 332 may also contact a subscriber manager (SM) 338 to find out whether there are any subscribers interested in receiving notification of an event. If at least one subscriber is found, the NM 332 may attempt to deliver event notification data to that subscriber. If a subscriber has identified a specific notification method, the NM 332 may attempt to deliver the notification using a transport protocol designated by the subscriber during a subscription request or at some other time.

Some embodiments of a CWSF 350 may also comprise a user interface (UI) processor 334. A UI processor 334 may interface with an IDev UI panel 322. A UI processor 334 may provide UI content to IDev panel 322 to prompt for user input or inform a user of a condition on the IDev, a CWSF module or a remote application. A UI processor 334 may also accept user input from an IDev panel 322 and relay that input to IDev hardware 320, a CWSF module or a remote application 346. A UI processor 334 may enable remote applications 346 to display application-specific screens using an industry standard markup language, such as XHTML, to define forms. A UI processor may also be the source of event notifications such as an On_Hkey_Pressed notification, an On_User_Logout notification or another notification.

A CWSF 350 may also comprise a web service module (WSM) 336. A WSM 336 may provide a Simple Object Access Protocol (SOAP) interface for an IDev. Remote applications 346 may use a WSM 336 through a set of SOAP interface methods to control IDev hardware 320 including an IDev UI panel 322. A remote application 346 may also access and/or report to CWSF 350 modules through the WSM 336.

In some embodiments, a CWSF 350 may comprise a subscriber manager module (SMM) 338. An SMM 338 may manage a subscriber database 335 in which subscriber data is maintained for event subscriptions.

Some embodiments of a CWSF 350 may also comprise a markup language library, such as an XML library 340. XML library 340 may comprise a utility code library. XML library 340 may provide function for managing XML content. These functions may be used for parsing and/or generating XML data.

A CWSF 350 may also comprise an event delivery module (EDM) 324. An EDM 342 may deliver even notification messages to subscribers. An EDM 324 may access subscriber preferences, which may be stored in subscriber database 335 in some embodiments. This subscriber data may be used to select a transport mechanism for notification delivery.

Figure 31:
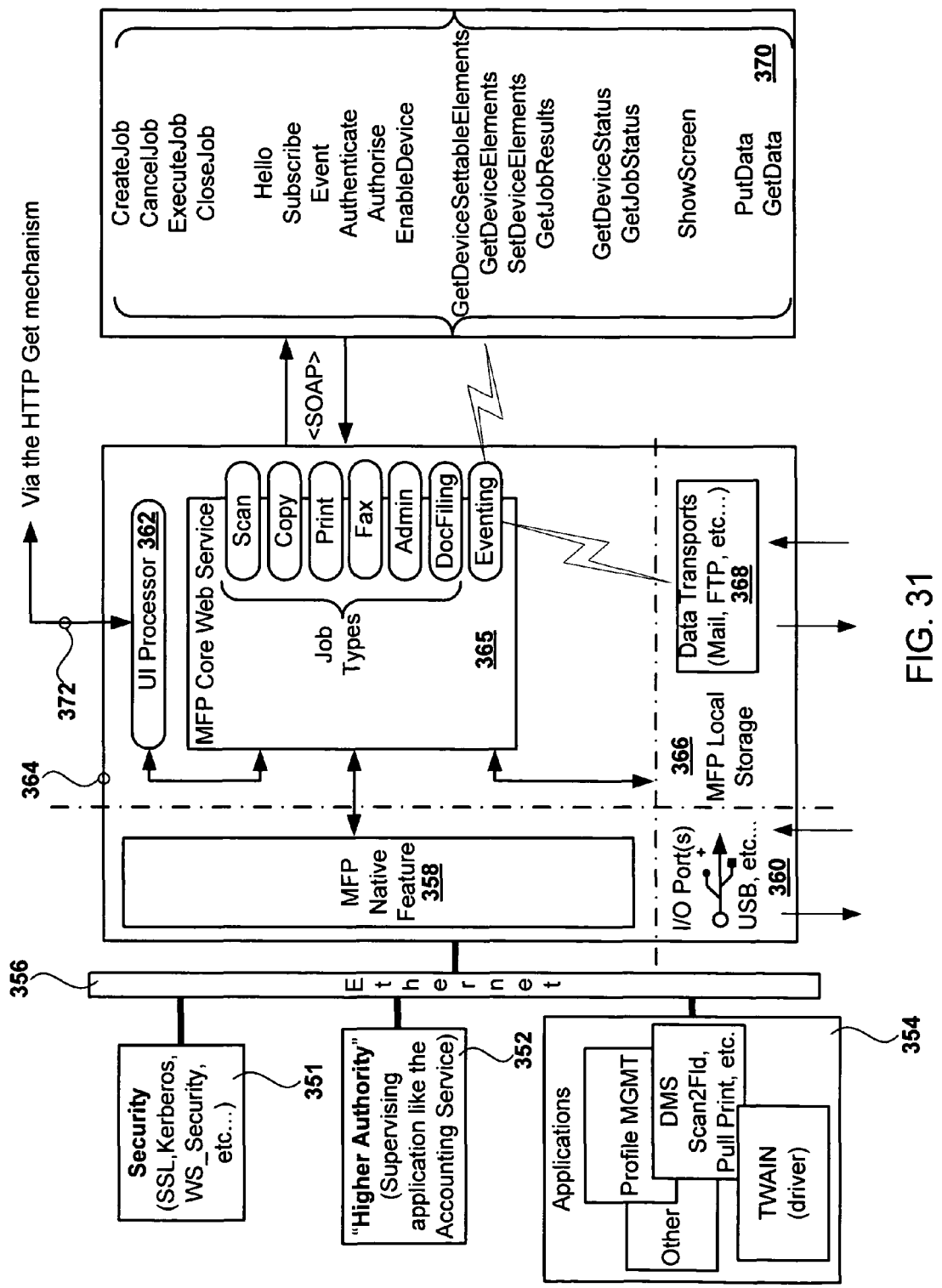
FIG. 31 is a diagram showing interaction with a Core Web Service Framework.

Some embodiments of the present invention are illustrated in FIG. 31. In these exemplary embodiments, remote applications, such as a security application 351, a "higher authority" application 352 or other applications 354 may connect to an IDev 364 over a communication link, such as a network 356. In these embodiments, an MFP Core Web Service (CWS) 365 may expose a SOAP interface to the external applications 351-354. When a remote client application 351-354, makes a SOAP request to the IDev, the CWS 365 assumes the responsibility of translating the markup language (e.g., XML) data representation of the request into a binary form that can be processed by the device. The CWS 365 may also translate any binary data returned to the remote clients into a suitable markup language.

In these exemplary embodiments, a CWS 365 may also assume the responsibility of verifying and validating the input markup language stream that is received from a remote client 351-354. This data validation may be performed according to the rules expressed in a Web Service Definition Language (WSDL) definition document for the SOAP interface. While a CWS 365 is processing a client SOAP request, it may also return error information serialized as a SOAP fault message.

When executing in secure mode, a CWS 365 may assume the responsibility of assuring that a request comes from an authorized source and that the user making the request has sufficient rights to make the request. A CWS 365 may also perform user session management.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A system for exposing imaging device (IDev) functions to an application, said system comprising:

an IDev hardware interface (HWIF) implemented with a processor and a memory, said HWIF comprising a set of device-independent application programming interfaces (APIs) receiving translated requests from a system architecture layer (SAL), said SAL interpreting said requests from input received from a web service module (WSM), wherein said HWIF provides communication with and control of multiple IDev hardware devices, wherein said HWIF provides device-specific operation of IDev hardware devices by converting translated SAL requests not comprising hardware-specific commands into hardware-specific commands comprising hardware architecture details and wherein said HWIF is logically located between said IDev hardware devices and said SAL;

an IDev user interface (UI) panel comprising an input device for receiving user input from a user, said UI panel further comprising an IDev display for displaying content to said user;

an IDev user interface (UI) processor logically located between said WSM and said IDev UI panel, wherein said UI processor receives UI content from said WSM and relays said UI content to said IDev UI panel and wherein said UI processor receives user input from said IDev UI panel and relays said user input to said WSM as a UI input markup language message and wherein said WSM receives IDev display content from a remote application and directs said IDev display content to said UI processor as a display content markup language message and said WSM receives said user input markup language message from said UI processor, formats said user input markup language message for said remote application and sends said formatted user input markup language message to said remote application;

a system architecture layer (SAL) for providing a logical connection with said HWIF module by translating high-level application requests, received via said WSM, into job-type-specific requests at an HWIF level, wherein said SAL groups together a sequence of atomic operations into high-level functions;

a web service module (WSM) for providing a function interface enabling said application to control said IDev, wherein said WSM receives display menu content from said application, converts said menu content into markup language display menu content and forwards said markup language display menu content to said UI processor and wherein said UI processor converts said markup language display menu content into a markup language format compatible with an IDev UI display panel thereby creating display-panel-compatible markup language menu content and said UI processor sends said display-panel-compatible menu content to said IDev UI display panel;

a job queue manager (JQM) for managing IDev system jobs through the use of job objects related to user processes, wherein each job is represented by a job identifier (job ID) and is associated with job settings, job results and an access control list comprising information for authenticating requests for job-related notifications, wherein said JQM also manages job settings and keeps track of security data associated with a job's user, wherein said JQM maintains a job object database of jobs currently being executed on said IDev and associated hardware and applications, and wherein said JQM and said WSM control access to IDev functions and hardware through the use of said access control list, wherein said SAL, said WSM and said JQM are implemented with a hardware processor; and a device management application programming interface (API) enabling said remote application to obtain and set IDev device status settings, IDev device configuration options, IDev web page settings, IDev key operator programs, IDev job status data, IDev click counts, IDev data security settings and IDev reboot functions.

2. A system as described in claim 1 wherein said function interface comprises a set of SOAP interface methods.

3. A system as described in claim 1 wherein said IDev-independent requests are implemented as IDev-specific operations by said IDev hardware interface.

4. A system as described in claim 1 wherein said application resides on said IDev.

5. A system as described in claim 1 wherein said application resides on a remote computing device (RCD) remote to said IDev.

6. A system as described in claim 1 wherein said IDev UI processor accepts input from an IDev user interface.

7. A system as described in claim 1 wherein said WSM validates a function request from said application.

8. A system as described in claim 7 wherein said WSM performs said validation in conjunction with a library.

9. A system as described in claim 8 wherein said library is an XML library.

10. A system as described in claim 7 wherein said WSM reports faults generated by said validation of said function request.

11. A system as described in claim 7 wherein said function request is a SOAP request.

12. A system for exposing imaging device (IDev) functions to an application, said system comprising:

an IDev user interface (UI) panel comprising an input device for receiving user input from a user, said UI panel further comprising an IDev display for displaying content to said user;

a web service module (WSM) for providing a function interface enabling said application to control said IDev, wherein said WSM receives display menu content from said application, converts said menu content into markup language display menu content and forwards said markup language display menu content to said UI processor and wherein said UI processor converts said markup language display menu content into a markup language format compatible with an IDev UI display panel thereby creating display-panel-compatible markup language menu content and said UI processor sends said display-panel-compatible menu content to said IDev UI display panel;

a user interface (UI) processor logically located between said WSM and said IDev UI panel, said UI processor for processing information between said IDev user interface and said application, wherein said WSM receives display menu content from said application, converts said menu content into markup language display menu content and forwards said markup language display menu content to said UI processor and wherein said UI processor converts said markup language display menu content into a markup language format compatible with an IDev UI display panel thereby creating display-panel-compatible markup language menu content and said UI processor sends said display-panel-compatible menu content to said IDev UI display panel;

a job queue manager (JQM) for managing IDev system jobs through the use of job objects related to user processes, wherein each job is represented by a job identifier (job ID) and is associated with job settings, job results and an access control list comprising information for authenticating requests for job-related notifications, wherein said JQM also manages job settings and keeps track of security data associated with a job's user, wherein said JQM maintains a job object database of jobs currently being executed on said IDev and associated hardware and applications, and wherein said JQM and said WSM control access to IDev functions and hardware through the use of said access control list; and a device management application programming interface (API) enabling said application to obtain and set IDev device status settings, IDev device configuration options, IDev web page settings, IDev key operator programs, IDev job status data, IDev click counts, IDev data security settings and IDev reboot functions.

13. A system as described in claim 12 wherein said IDev user interface displays screens specific to said application.

14. A system as described in claim 13 wherein said application uses a markup language to define said screens.

15. A system as described in claim 12 wherein said application resides on said IDev.

16. A system as described in claim 12 wherein said application resides on a remote computing device (RCD) remote to said IDev.

* * * * *